US011562349B2

(12) United States Patent
McCauley et al.

(10) Patent No.: US 11,562,349 B2
(45) Date of Patent: Jan. 24, 2023

(54) RISK MITIGATION FOR A CRYPTOASSET CUSTODIAL SYSTEM USING DATA POINTS FROM MULTIPLE MOBILE DEVICES

(71) Applicant: Anchor Labs, Inc., San Francisco, CA (US)

(72) Inventors: Nathan P. McCauley, San Francisco, CA (US); Diogo Monica, San Francisco, CA (US); Boaz Avital, San Francisco, CA (US); Riyaz D. Faizullabhoy, Los Altos, CA (US); Joao Manuel Pinto Peixoto, San Francisco, CA (US); Kristen B. Howard, San Francisco, CA (US)

(73) Assignee: Anchor Labs, Inc., San Francisco, CA (US)

( * ) Notice: Subject to any disclaimer, the term of this patent is extended or adjusted under 35 U.S.C. 154(b) by 0 days.

(21) Appl. No.: 16/577,361

(22) Filed: Sep. 20, 2019

(65) Prior Publication Data
US 2021/0056540 A1    Feb. 25, 2021

Related U.S. Application Data

(60) Provisional application No. 62/889,381, filed on Aug. 20, 2019.

(51) Int. Cl.
*G06Q 20/40* (2012.01)
*G06Q 20/36* (2012.01)
(Continued)

(52) U.S. Cl.
CPC ......... *G06Q 20/3674* (2013.01); *G06N 20/00* (2019.01); *G06Q 20/3278* (2013.01); *G06Q 20/4016* (2013.01); *H04L 9/0637* (2013.01)

(58) Field of Classification Search
CPC ........... G06Q 20/3674; G06Q 20/3278; G06Q 20/4016; G06Q 20/065; G06Q 20/223;
(Continued)

(56) References Cited

U.S. PATENT DOCUMENTS 6,950,523 B1    9/2005    Brickell et al.
9,672,499 B2    6/2017    Yang et al.
(Continued)

FOREIGN PATENT DOCUMENTS

| CN | 102769529 A | * 11/2012 | ............. H04L 29/06 |
| CN | 104809380 B | * 10/2018 | ............. G06F 21/32 |
| WO | WO 2019/168792 | 9/2019 | |

OTHER PUBLICATIONS

Anonymous: "Hierarchical Deterministic: Wallets—BIP32", Feb. 2017, Retrieved from the Internet: URL:https://github.com/bitcoin/bips/blob(11b0fa37bee4eac40c3a1be059107868$bcc3392/bip-0032.mediawiki [retrieved on Jun. 20, 2018].
(Continued)

*Primary Examiner* — Neha Patel
*Assistant Examiner* — Chunling Ding
(74) *Attorney, Agent, or Firm* — Bookoff McAndrews, PLLC

(57) ABSTRACT

Methods, systems, and apparatus for risk mitigation for a cryptoasset custodial system include transmitting an endorsement request for a cryptoasset transaction to a user device configured to cause the user device to prompt a user to endorse the cryptoasset transaction. Multiple data points are collected from mobile devices associated with the user. The data points indicate an identity of the user. A cryptographic endorsement of the cryptoasset transaction is received from the user device. A graphical visualization including a risk metric is generated based on the data points. The risk metric indicates a risk of accepting the crypto-
(Continued)

graphic endorsement from the user device. Generating the graphical visualization includes determining whether the plurality of data points matches expected values.

20 Claims, 11 Drawing Sheets

(51) Int. Cl.
*G06Q 20/32* (2012.01)
*G06N 20/00* (2019.01)
*H04L 9/06* (2006.01)

(58) Field of Classification Search
CPC .......... G06Q 20/3678; G06Q 20/3829; G06Q 20/389; G06Q 20/401; G06N 20/00; H04L 9/0637; H04L 9/3255; H04L 2209/38; H04L 2209/56; H04L 9/3239; G06F 2221/2111; G06F 21/40
See application file for complete search history.

(56) References Cited

U.S. PATENT DOCUMENTS

| | | | |
|---|---|---|---|
| 9,892,460 B1* | 2/2018 | Winklevoss | G06Q 40/04 |
| 9,916,581 B2 | 3/2018 | Dorsey et al. | |
| 10,068,228 B1 | 9/2018 | Winklevoss et al. | |
| 10,373,158 B1 | 8/2019 | James et al. | |
| 10,439,811 B2 | 10/2019 | Norton | |
| 10,581,612 B2* | 3/2020 | Landrock | H04L 9/3247 |
| 2004/0128504 A1 | 7/2004 | Kivinen | |
| 2004/0236694 A1 | 11/2004 | Tattan | |
| 2005/0273442 A1 | 12/2005 | Bennett | |
| 2008/0031460 A1 | 2/2008 | Brookner et al. | |
| 2010/0024017 A1* | 1/2010 | Ashfield | H04L 63/0853 726/7 |
| 2010/0119061 A1 | 5/2010 | Kawale | |
| 2011/0154025 A1 | 6/2011 | Spalka | |
| 2012/0192260 A1 | 7/2012 | Kontsevich | |
| 2014/0046842 A1* | 2/2014 | Irudayam | G06Q 20/3223 705/43 |
| 2014/0156534 A1 | 6/2014 | Quigley et al. | |
| 2015/0088754 A1* | 3/2015 | Kirsch | G06Q 20/401 713/171 |
| 2015/0170112 A1 | 6/2015 | DeCastro | |
| 2015/0287026 A1 | 10/2015 | Yang et al. | |
| 2015/0373122 A1 | 12/2015 | Steel et al. | |
| 2016/0189134 A1* | 6/2016 | Voege | G06F 21/35 705/44 |
| 2016/0253663 A1* | 9/2016 | Clark | G06Q 20/3678 705/75 |
| 2016/0283920 A1 | 9/2016 | Fisher et al. | |
| 2016/0285872 A1 | 9/2016 | Polar | |
| 2017/0006018 A1 | 1/2017 | Campagna | |
| 2017/0154331 A1 | 6/2017 | Voorhees | |
| 2017/0230375 A1 | 8/2017 | Kurian | |
| 2017/0373849 A1 | 12/2017 | Donner et al. | |
| 2017/0374033 A1 | 12/2017 | Kovacs | |
| 2018/0130158 A1 | 5/2018 | Atkinson et al. | |
| 2018/0181737 A1* | 6/2018 | Tussy | G06V 40/172 |
| 2018/0309792 A1* | 10/2018 | Obaidi | G06F 21/32 |
| 2018/0337771 A1 | 11/2018 | Baker et al. | |
| 2018/0367311 A1 | 12/2018 | Stahlberg | |
| 2018/0367316 A1 | 12/2018 | Cheng et al. | |
| 2019/0043022 A1* | 2/2019 | Fosmark | G06Q 20/02 |
| 2019/0207915 A1 | 7/2019 | Schaap | |
| 2019/0236594 A1 | 8/2019 | Ehrloch-Quinn et al. | |
| 2019/0251524 A1* | 8/2019 | Sadrizadeh | G06Q 20/401 |
| 2019/0266576 A1 | 8/2019 | McCauley et al. | |
| 2019/0268165 A1 | 8/2019 | Monica et al. | |
| 2019/0305956 A1* | 10/2019 | Irani, III | H04L 9/3231 |
| 2019/0347666 A1* | 11/2019 | Bermudez-Cisneros | G06F 21/31 |
| 2019/0356491 A1* | 11/2019 | Herder, III | H04L 9/3239 |
| 2019/0372779 A1 | 12/2019 | Monica et al. | |
| 2020/0167338 A1 | 5/2020 | Brock et al. | |
| 2020/0266997 A1 | 8/2020 | Monica et al. | |
| 2020/0380523 A1* | 12/2020 | Agrawal | G06Q 20/3226 |
| 2020/0382491 A1* | 12/2020 | Kursun | H04L 63/1433 |

OTHER PUBLICATIONS

Anonymous: "How to properly secure cryptocurrencies exchanges—Ledger", Aug. 2016, Retrieved from the Internet: URL:https://www.ledger.fr/2016/08/08/hcpw-to-properly-secure-cryptocurrencies-exchanges/ [retrieved on Jun. 29, 2018].
Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.
International Search Report and Written Opinion in Application No. PCT/US2019/019414, dated May 15, 2019, 12 pages.
International Search Report and Written Opinion in Application No. PCT/US2019/019425, dated May 9, 2019, 12 pages.
Monica, "Crypto Anchors: Exfiltration Resistant Infrastructure," 11 pages, dated Oct. 8, 2017.
Monica, "Increasing Attacker Cost Using Immutable Infrastructure," 8 pages, dated Nov. 19, 2016.
Monica, "The two metrics that matter for host security," 6 pages, dated Aug. 31, 2017.
Wired.com [online], "Crypto anchors' might stop the next Equifax-style megabreach," Oct. 11, 2017, retrieved from: URLhttps://www.wired.com/story/crypto-anchors-breach-security/>, 11 pages.
U.S. Appl. No. 16/276,567, Monica et al., filed Feb. 14, 2019.
Bonneau et al., "SoK: Research Perspectives and Challenges for Bitcoin and Cryptocurrencies," 2015 IEEE Symposium on Security and Privacy, May 17-21, 2015, San Jose, CA, USA, 104-121.
Liu et al., "Security Analysis of Electronic Payment Protocols Based on Quantum Cryptography," 2017 4th International Conference on Information Science and Control Engineering, Jul. 21-23, 2017, Changsha, China, 1709-1712.
PCT International Search Report and Written Opinion in International Appln. No. PCT/US2020/017411, dated Apr. 15, 2020, 19 pages.
Anonymous: "CASP Solution Overview," and "Installing Casp" Mar. 2019, retrieved from the Internet: URL: https://www.unboundtech.com/docs/CASP/Versions/1.0.1902/CASPUserGuideHTML/Content/Products/CASP/CASP_Offering_Description/Solution.htm#h2 10.
PCT International Search Report and Written Opinion in International Appln. No. PCT/US2020/043882, dated Nov. 2, 2020, 12 pages.
PCT International Search Report and Written Opinion in International Appln. No. PCT/US2020/045737, dated Nov. 11, 2020, 12 pages.
"Sato et al., ""General Security Considerations for Cryptoassets Custodians draft-vegtf-crypto-assets-security-considerations-04,""" Apr. 2019, retrieved from the Internet: URL:https://tools.ietf.org/html/draft-vegtf-crypto-assets-security-considerations-04, 47 pages".
International Search Report and Written Opinion dated Feb. 12, 2021, in corresponding International Application No. PCT/US2020/045636 (12 pages).

* cited by examiner

RISK MITIGATION FOR A CRYPTOASSET CUSTODIAL SYSTEM USING DATA POINTS FROM MULTIPLE MOBILE DEVICES

CROSS-REFERENCE TO RELATED APPLICATIONS

This application claims the benefit of U.S. Patent Application No. 62/889,381, filed Aug. 20, 2019, which is incorporated by reference herein.

TECHNICAL FIELD

This description relates generally to risk mitigation for a cryptoasset custodial system.

BACKGROUND

Cryptocurrencies such as Bitcoin, Ethereum, Ripple and others have gained in popularity and value in recent years and are expected by many to continue to do so. Every day an increasing variety of transactions are conducted based on cryptocurrencies, and it is conceivable that new types of cryptographic cryptoassets may be created in the future, i.e., cryptographic assets that are not necessarily currencies.

With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" are sometimes used to store cryptocurrency, however, those devices limit access only to the owner of the device and are therefore not suitable for many business uses, where a number of individuals may require access to cryptographic funds or other cryptoassets.

SUMMARY

This specification describes risk mitigation for a cryptoasset custodial system (sometimes referred to as a "CCS"). Methods, systems, and apparatus for risk mitigation for a cryptoasset custodial system include a server computer configured to transmit an endorsement request for a cryptoasset transaction to be performed by the server computer on a blockchain. The endorsement request can be transmitted to a user device associated with a user of the cryptoasset custodial system. The endorsement request can be configured to cause the user device to prompt the user to endorse the cryptoasset transaction. The server computer can receive multiple data points collected from one or more mobile devices that are communicably coupled to the user device and associated with the user. The data points can indicate an identity of the user. A risk analysis module is communicably coupled to the server computer. The risk analysis module can generate a graphical visualization of a risk metric based on the data points on a risk review dashboard. The risk metric indicates a risk of accepting an endorsement of the cryptoasset transaction from the user device.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
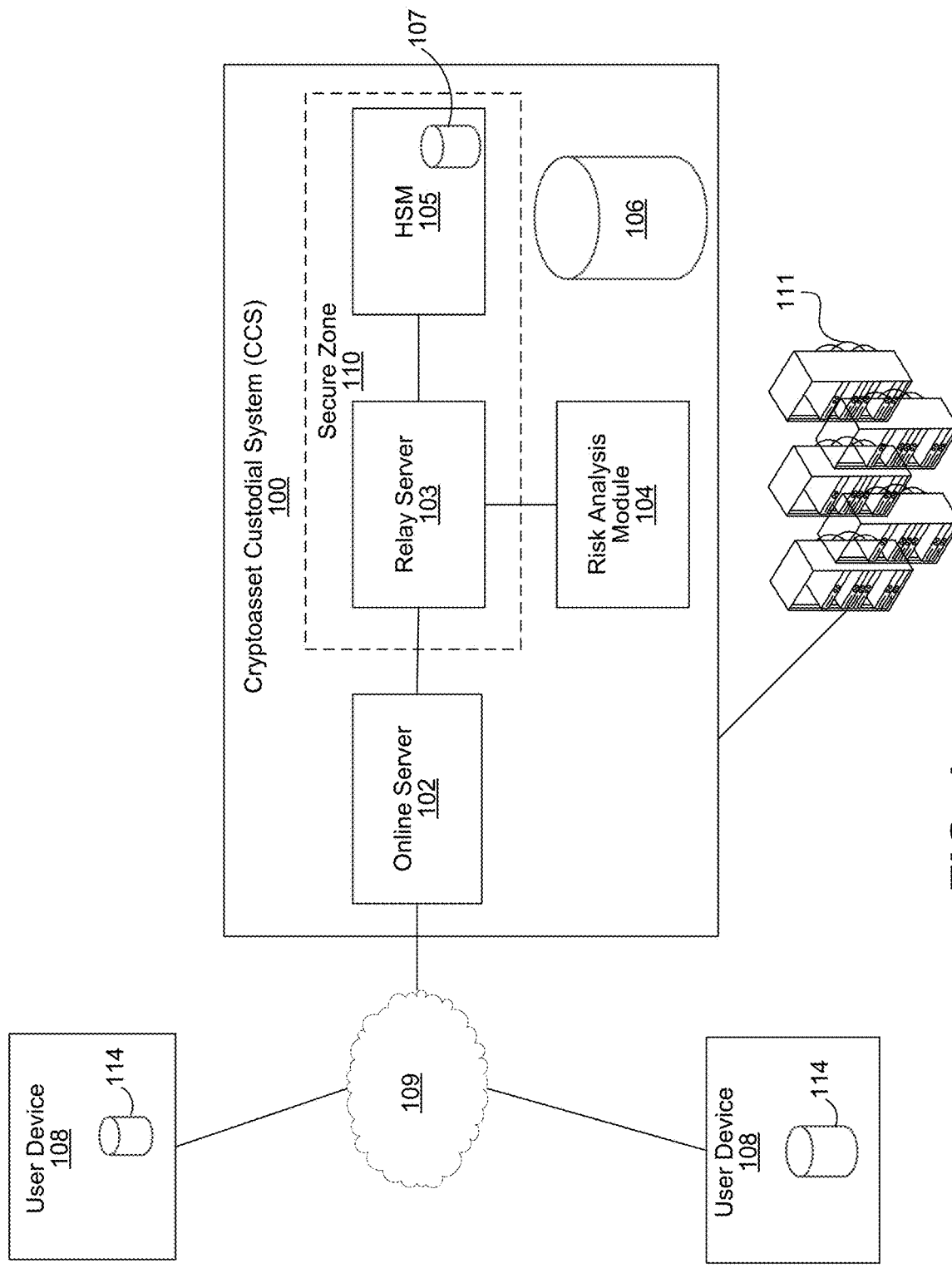
FIG. 1 illustrates an example block diagram of a cryptoasset custodial system.

In the following description, for the purposes of explanation, numerous specific details are set forth in order to provide a thorough understanding of the disclosed embodiments. It will be apparent, however, that the embodiments may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

FIG. 1 illustrates an example block diagram of a cryptoasset custodial system 100. The cryptoasset custodial system 100 is a computer-implemented system for maintaining custody of, and controlling access to, cryptocurrencies and/or other cryptoassets. The cryptoasset custodial system 100 may be owned and/or operated by a business enterprise, referred to herein as the Cryptoasset Custodian. The cryptoasset custodial system 100 includes multiple layers of security so as to enable large volumes of cryptoassets to be maintained in a secure manner. In certain embodiments the cryptoasset custodial system 100 includes a combination of biometric-based multi-user validation, transaction risk analysis, and use of a hardware security module 105 to provide authentication/validation functionality and secure storage of private keys of cryptoassets. Furthermore, two or more different biometric authentication techniques may be applied to any given transaction request. As used herein, the term "hardware security module" refers to a special-purpose physical computing device that safeguards and manages digital keys for authentication and provides cryptoprocessing functionality. The hardware security module 105 can be embodied as a plug-in card or an external device that attaches directly to a computer.

In certain embodiments, when a user device 108 requests a transaction involving a cryptoasset, such as a withdrawal of transfer of cryptocurrency funds, the cryptoasset custodial system 100 causes an endorsement request message to be sent to each of multiple user devices 108, each of which is associated with a different user who has been defined as an eligible member of a quorum for transactions involving that cryptoasset (in other embodiments, multiple users may share the same user device 108). The endorsement request message is configured to cause each receiving user device 108 to prompt its endorser/user to provide a cryptographic endorsement of the requested transaction. An endorsement in such a context is an approval or rejection of an operation by an endorser/user. When an endorser/user receiving such a prompt endorses the transaction on his or her user device 108 (e.g., a smartphone, tablet or notebook computer), the user device 108 signs a cryptographic endorsement with a private key of that user and transmits the signed endorsement to the cryptoasset custodial system 100. The private key is stored within a secure enclave 114 within the user device 108. A secure enclave 114 in each user device 108 is used to store the corresponding user's private key and to generate digital signatures of that user.

The hardware security module 105 determines whether a policy-based quorum of multiple users has endorsed (approved) a requested action, such as a withdrawal or transfer of cryptocurrency funds. The hardware security module 105 generates a signature using a private key and validates the signature using a public key of a public-private key pair for each of the users, in cryptographic endorsements received from the users. In one implementation, only after determining that the policy-based quorum of the multiple users has validly endorsed the requested action, the hardware security module 105 allows itself to access or derive the private key of that particular cryptographic asset (e.g., for a specific deposit of cryptocurrency funds), and uses that private key to sign the transaction as authorization that the transaction may proceed.

The private key (sometimes referred to as a "cryptoasset key") of the particular cryptographic asset may be accessed or derived using a client key and the client key can be derived from an encrypted client key stored on one or more user devices for authorized representatives of the client. The encrypted client key can be transmitted to the hardware security module 105 and the hardware security module can derive the client key from the encrypted client key by decrypting the encrypted client key using the hardware-based cryptographic key stored within the secure storage device of the hardware security module 105. The hardware-based cryptographic key within the secure storage device 107 of the hardware security module 105 is stored only in the hardware security module 105, thus the hardware-based cryptographic key cannot be read by any entity outside the hardware security module 105. Approval of the transaction may include, for example, transmitting the transaction onto a known blockchain network. In certain embodiments, approval of the transaction by the hardware security module 105 occurs only if and after the requested transaction has passed a risk review, which may be partially or fully automated. The system and techniques introduced here can also be used for secure custody of other types of digital assets besides cryptoassets.

Refer now to FIG. 1, which shows a high-level block diagram of the cryptoasset custodial system 100. In the illustrated embodiment, the cryptoasset custodial system 100 includes a server computer 102, a relay server 103, a risk analysis module 104, the hardware security module 105, and a data storage facility 106. The data storage facility 106 may include one or more databases, which can be or include relational databases or any other type of mechanism for storing data in an organized way, where the data may be structured data and/or unstructured data. The hardware security module 105 also includes its own internal secure storage facility 107. Note that there can be multiple instances of each of the above-mentioned components in the cryptoasset custodial system 100, even though only one of each is shown to simplify description. One or more user devices 108, also called clients, can communicate with the cryptoasset custodial system 100 via a public computer network 109, such as the Internet. Each of the user devices 108 may be any one of, for example, a smartphone, tablet computer, laptop computer, desktop computer, or the like. Each user device 108 may include a secure enclave 14, such as an iOS-based secure enclave, which is used to store the corresponding user's private key and to generate digital signatures of that user. In at least some embodiments, each user device 108 is associated with a different user, and the description herein henceforth assumes such an embodiment to facilitate description. Note, however, that it is possible to have embodiments in which multiple users share the same user device 108.

In some embodiments, the relay server 103 functions as a bridge over a physical air gap to isolate the hardware security module 105 from the public computer network 109. In other embodiments, the relay server 103 functions as a virtual air gap to isolate the hardware security module 105 from the public computer network 109. The relay server 104 and hardware security module 105 operate within a secure zone 110. The hardware security module 105 may physically reside in a physically secured datacenter with no direct access to any outside network. Messages between the hardware security module 105 and the server computer 102 are routed on a half-duplex connection to the relay server 103 in the secure zone 110. The relay server 103 disconnects itself from the secure network while communicating with the server computer 102, and disconnects itself from all external networks while communicating with the hardware security module 105, such that no interactive sessions with those devices can be established from the outside. The relay server 103 provides "air gap" security to critical infrastructure.

In certain embodiments, the cryptoasset custodial system 100 also has access to at least one blockchain network 111 corresponding to a cryptoassets of which the cryptoasset custodial system 100 has custody. Access to the blockchain network 111 may be via the public computer network 109, e.g., the Internet.

In some embodiments, each transaction submitted by a customer of the cryptoasset custodial system 100 will go through the risk analysis module 104, which may be partially or fully automated. For example, with some embodiments of the cryptoasset custodial system 100, automated risk analysis software can make a decision on whether a proposed transaction is acceptable. A risk analysis agent or the software can follow a policy set on each individual vault and can look at any of various risk signals (e.g., the amount being transacted, how many users have authorized the transaction, the location(s) from which the transaction was requested and approved, the destination address) to compute a final risk metric that might lead to the transaction being approved or more information being requested.

Figure 2A:
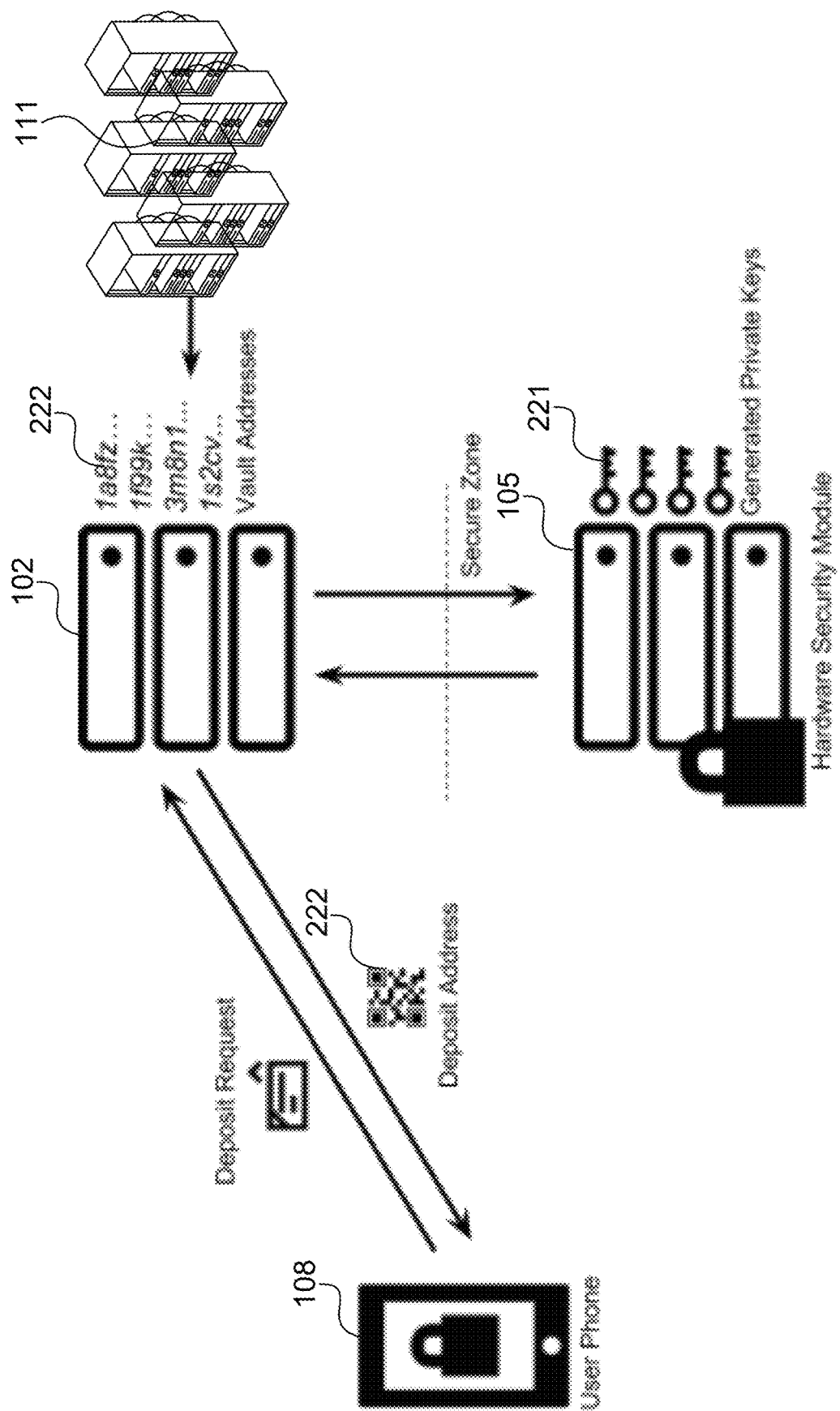
FIG. 2A is a schematic diagram illustrating an example of a deposit process flow with the cryptoasset custodial system.
Figure 2B:
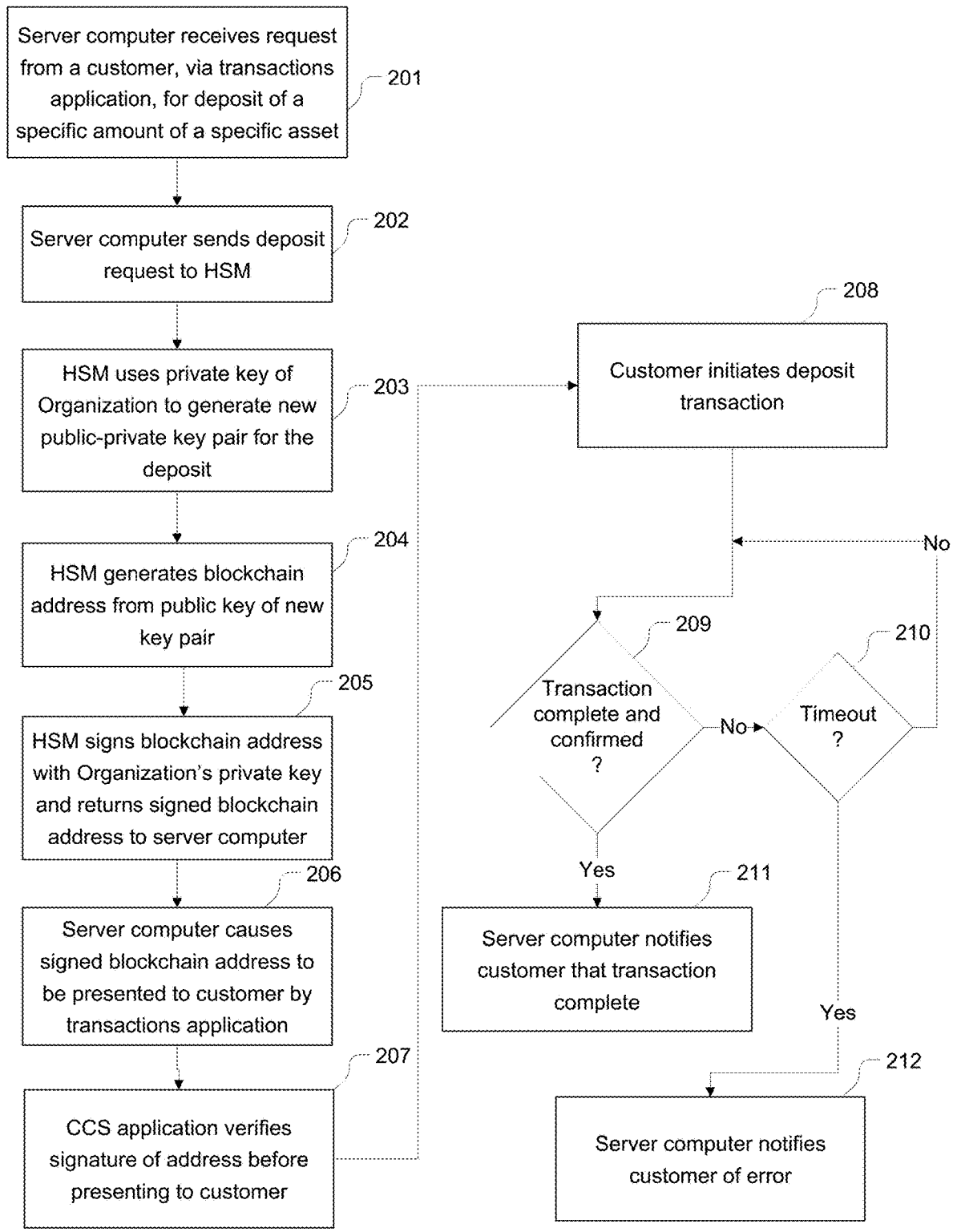
FIG. 2B is a flow diagram illustrating an example of the deposit process flow.

FIG. 2A is a schematic diagram illustrating an example of a deposit process flow with the cryptoasset custodial system 100. FIG. 2B is a flow diagram illustrating an example of the deposit process flow. In some embodiments, deposits are initiated by a customer via the Internet through a software application (hence referred to as the "cryptoasset custodial system application") executing on a user device 108 of the customer. In some embodiments, the initiation of deposit operations is performed using the web dashboard. Such initiation of a deposit request can require a cryptographic endorsement to be performed on the cryptoasset custodial system application. In some embodiments, a cryptographic endorsement is not required for initiation of a deposit request.

The initiation of a deposit can be performed by the customer's selecting a cryptoasset type and requesting a deposit for a given amount in the cryptoasset custodial system application. Once initiated, the request for a blockchain deposit address is sent to the server computer 102, which receives the request (step 201) and forwards it (step 202) via the relay server 103 to the hardware security module 105 (which as noted above is isolated from the Internet by the relay server 103). The hardware security module 105 generates (step 203) a new public-private key pair 221 to correspond uniquely with the deposit, i.e., to correspond with the requested blockchain address. In certain embodiments, the hardware security module 105 uses the private key of the relevant Organization and a key derivation function (KDF) to generate the new key pair for the blockchain address. An "Organization" in such a context is a data structure that corresponds to a particular customer, as discussed further below. In one implementation, the private key of the newly generated key pair cannot be extracted from the hardware security module 105, but can be backed up securely in an encrypted file. In this implementation, key generation inside the hardware security module 105 ensures that the private keys 221 only exist within the hardware security module 105, are not available anywhere else in the world and cannot be accessed by any entity that is external to the hardware security module 105.

The hardware security module 105 next generates (step 204) the blockchain address for the deposit from the public key of the newly-created key pair. A blockchain-specific transformation of the public key of the blockchain address can be used. The hardware security module 105 signs (step 205) the blockchain address with the Organization's private key and returns the signed blockchain address to the server computer 102. The server computer 102 causes (step 206) the signed blockchain address 222 to be sent to the customer's user device 108, to cause the user device 108 to present the address to the customer in the cryptoasset custodial system application on a user device 108, in an easy-to-consume and shareable format (e.g., as a QR code), for use as a destination address in a blockchain transaction. The cryptoasset custodial system application on the user device 108 verifies (step 207) the signature of the address before presenting the address to customer.

The customer's user device 108 uses the public key of the Organization (which it previously received from the cryptoasset custodial system 100 and locally stored) to verify the authenticity of the blockchain address it receives from the cryptoasset custodial system 100. The customer initiates (step 208) a transaction to deposit cryptoassets into the cryptoasset custodial system 100. The transaction might be initiated from an exchange, from the customer's personal wallet, or from another cryptoasset store. No confirmation is required for the cryptoassets to show up in the cryptoasset custodial system 100.

The address of the deposit is stored in a collection with other addresses belonging to the customer in the cryptoasset custodial system 100, known as the customer's "vault." A vault in such a context is a data entity that contains cryptoassets and a policy map containing one or more policies governing deposits and withdrawals from those cryptoassets and relevant blockchain governance actions. For example, the governance actions can include delegation, staking, and voting. The policies can govern participation in transactions related to the cryptoassets. A cryptoasset is represented as a slot inside a vault that can hold an amount of a cryptoasset type (e.g., Bitcoin, Ethereum). Once under custody and stored with the cryptoasset custodial system 100, a cryptoasset is completely under the control of the cryptoasset custodial system 100.

The server computer 102 determines whether the customer has confirmed the transaction within the defined time period (steps 209, 210). Once the deposit transaction is confirmed by customer and confirmed on the blockchain, the customer is notified (step 211) by the server computer 102, and the cryptoassets are considered to be under custody of the cryptoasset custodial system 100. In the event confirmation is not received within the defined time period, the server computer 102 notifies (step 212) the customer of an error in the transaction.

Figure 3A:
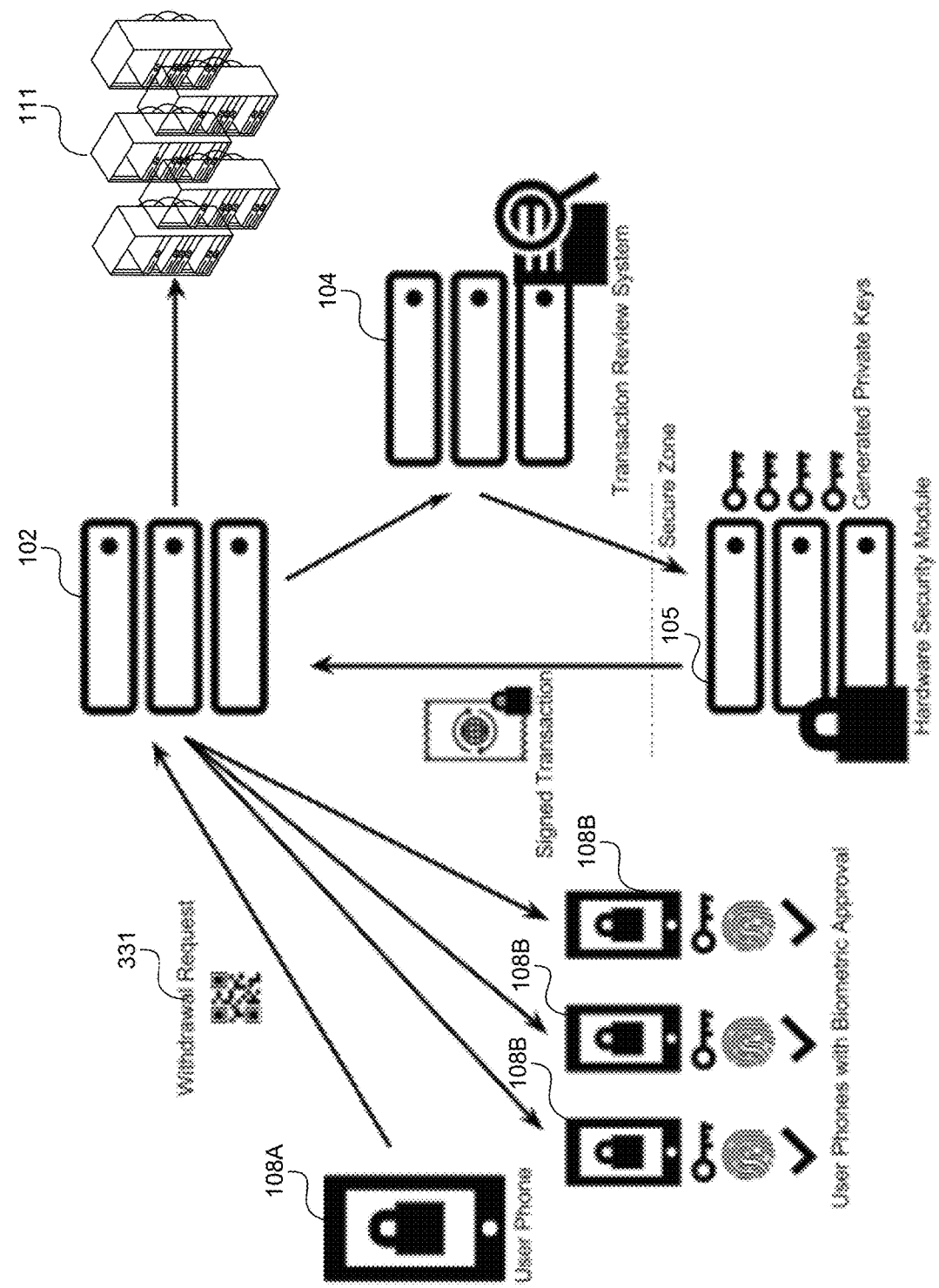
FIG. 3A is a schematic diagram illustrating an example of a withdrawal process flow with the cryptoasset custodial system.
Figure 3B:
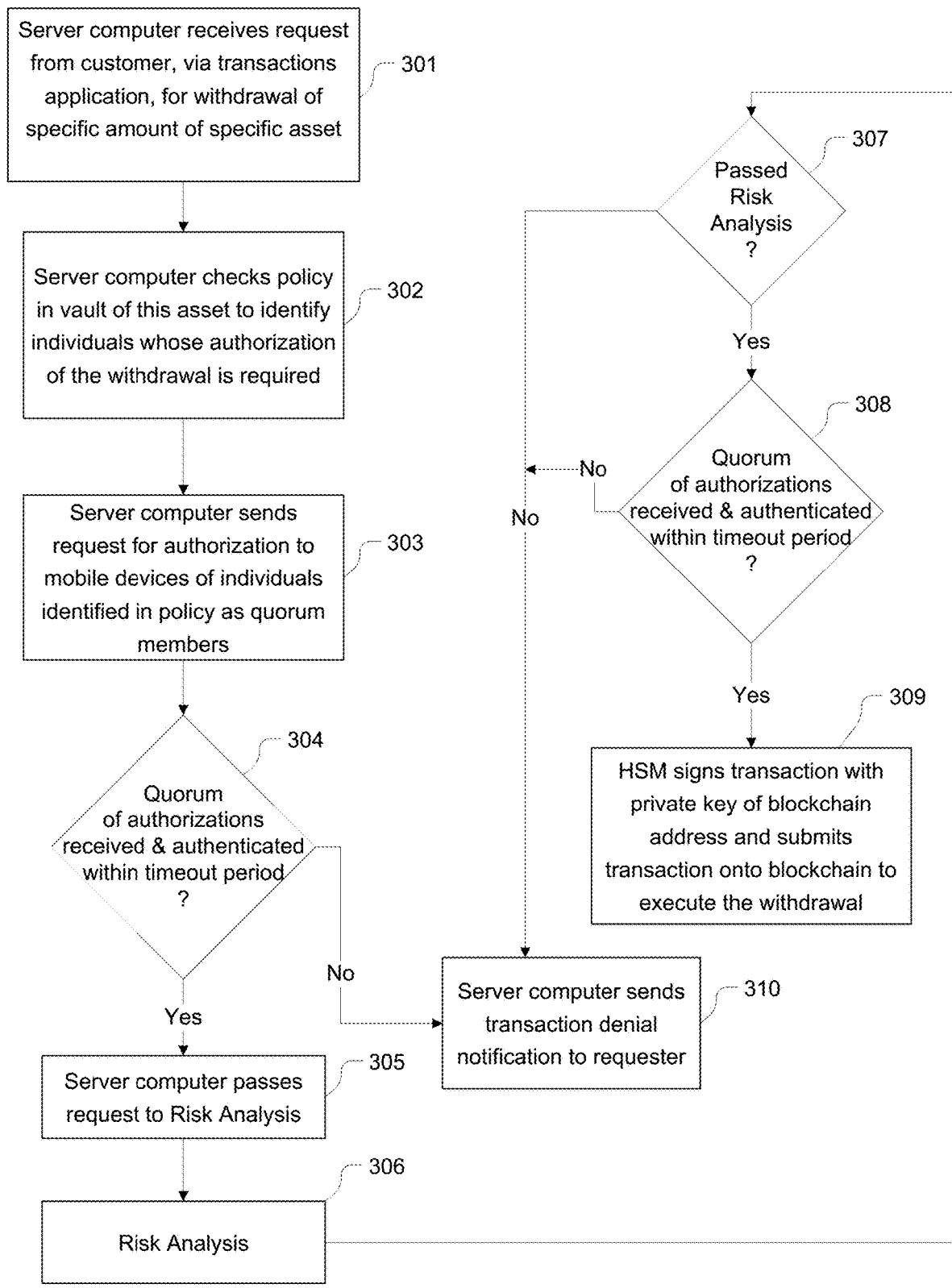
FIG. 3B is a flow diagram illustrating an example of the withdrawal process flow.

FIG. 3A is a schematic diagram illustrating an example of a withdrawal process flow with the cryptoasset custodial system 100. FIG. 3B is a flow diagram illustrating an example of the withdrawal process flow. FIGS. 3A and 3B illustrate an example of the process of withdrawing an amount of a previously deposited cryptoasset, such as a cryptocurrency. Withdrawals can be initiated from the cryptoasset custodial system application on a user device 108A by selecting a specific cryptoasset to withdraw and an amount. Once initiated, authorizing parties are made aware of the withdrawal request. In one implementation, a quorum of authorized customers or users is required to authorize the withdrawal request individually on their mobile devices 108A and 108B. In some embodiments, one or more "required" customers or users are required to authorize the withdrawal request. The one or more "required" customers or users can be part of the quorum. In some embodiments, the defined quorum must be met and all the "required" users must have authorized the transaction. In some embodiments, conditional definitions for "required" users can be implemented. For example, "Require Joe Doe if the USD valuation is above $1 million or if the transaction amount is more than 50% of the holdings for the cryptoasset at a given time." In other embodiments, additional required approvals or conditions are configured for a "policy" to be satisfied.

During this process, authorized users are required to review the transaction and approve it, where each user's approval can be subject to biometric authentication (e.g., fingerprint, facial recognition and/or voice recognition). In certain embodiments, before a withdrawal can successfully move on to the next phase, every request is sent to the risk analysis module 104 to be inspected for suspicious activity and authorized as legitimate. The hardware security module 105 can validate that a defined quorum (e.g., a majority, 25%, or 33%) of users have authorized the transaction, and that the transaction was approved by the risk analysis module 104. For example, for a given corporate customer that has five distinct employees who need the ability to transfer funds, a suitable quorum configuration might be to require validated approval from a group of three of those five employees to move any funds. Once the hardware security module 105 validates compliance with a policy map including any quorum requirements, the hardware security module 105 authorizes the requested transaction, e.g., a requested withdrawal, by signing the requested transaction with the private cryptoasset specific key of the account holder. The server computer 102 submits the signed cryptoasset-moving transaction to the blockchain 111.

An example of the withdrawal process is further illustrated in FIG. 3B. The server computer 102 initially receives (step 301) the withdrawal request 331 from the customer. The server computer 102 checks (step 305) the approval policy for the cryptoasset that is the subject of the transaction, as indicated in the vault of the cryptoasset, to determine which individuals' authorizations (endorsements) may be used to satisfy a quorum to approve the withdrawal. The server computer 102 sends (step 306) endorsement requests to the mobile devices 108A, 108B of those individuals (the mobile devices have been previously registered with the cryptoasset custodial system 100). In response to these requests, one or more cryptographic endorsements may be received from users' mobile devices 108A, 108B, where the cryptographic endorsements were signed locally by the users' respective private keys stored securely in their respective mobile devices and subjected to one or more biometric authentication techniques, as described further below. Accordingly, the server computer 102 determines (step 304) whether, within a timeout period, a quorum of authorizations have been received and the corresponding authorizing parties have been authenticated, as specified in the policy for the cryptoasset. If so, the server computer 102 passes (step 305) the transaction request 331 to the risk analysis module 104. Otherwise, the server computer sends (step 310) a transaction denial notification to at least the user who requested the transaction (and possibly to all other users identified in the policy for the cryptoasset).

The risk analysis module 104 performs a risk analysis (step 306), which as noted above may be fully or partially automated. If the transaction passes risk analysis (step 306), control flow is passed to the hardware security module 105, which verifies (step 308) whether the quorum requirement has been satisfied, by performing the same determination as step 304 or a similar determination, as does the risk analysis module 104 (step 306) (described further below). If satisfaction of the quorum is verified by the hardware security module 105, the hardware security module 105 signs the withdrawal transaction with the private key of the blockchain address. The server computer 102 submits the transaction onto the blockchain 111 to execute the withdrawal (step 309). Otherwise, the hardware security module 105 signals a failure to the server computer 102, which in response sends (step 310) a transaction denial notification to at least the user who requested the transaction (and possibly to all other users identified in the policy for the cryptoasset).

As mentioned above, when a user endorses a transaction request, they can be subjected to one or more forms of authentication by their mobile device and/or the cryptoasset custodial system 100, to establish that they are the expected person taking the action. These authentication forms can include one or more biometric authentication techniques, such as fingerprint verification, voiceprint verification, speech recognition, facial recognition and/or gesture recognition. The user's mobile device (e.g., smartphone) can perform one or more of these authentication techniques.

Additionally, or alternatively, the user may be required to upload to the cryptoasset custodial system 100 a video, captured by their mobile device, from which their identity can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, or destination, the cryptoasset custodial system 100 may generate a random number that can be used to select a few (e.g., three to five) words from a set of known words. The cryptoasset custodial system 100 may present those words to the user and have the user speak them in a video captured by the user's mobile device, which the user's mobile device transmits to the cryptoasset custodial system 100. When reviewing the transaction, the reviewing mechanism can independently generate the expected words based on transaction data and verify that the user spoke those words. The video can also be subject to facial and/or voice recognition. By performing the deterministic challenge generation, an attacker can be prevented from faking a transaction by capturing and reusing previously transmitted authentication videos from the user.

Figure 4:
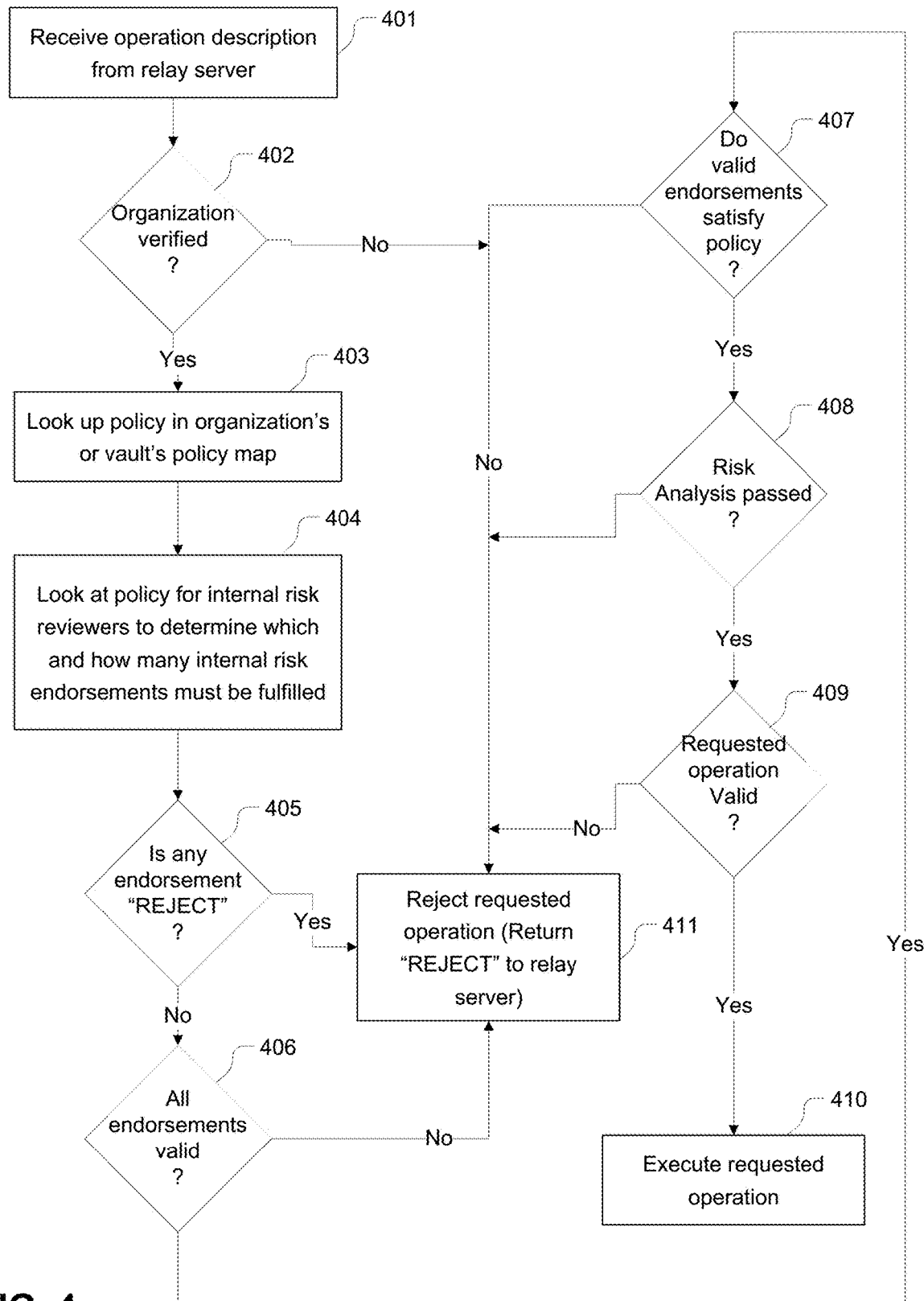
FIG. 4 is a flow diagram illustrating an example of a process performed by a hardware security module in connection with a requested operation.

FIG. 4 is a flow diagram illustrating an example of a process performed by a hardware security module 105 in connection with a requested operation. The main role of the hardware security module 105 is to verify the validity of operations. The hardware security module 105 carries out the will of the signers and authenticates that the signers are the authorized parties of an operation through the hardware security module 105's privileged access to keys. At least one key needed for signing transactions is stored securely in the hardware security module 105 and never leaves it. In some embodiments, the hardware security module 105 enforces these policies through a Secure Execution Environment (SEE) that runs code that cannot be changed except through physical access to the hardware security module 105 and requires a set of smartcards held securely by multiple employees of the Cryptoasset Custodian.

In certain embodiments, to facilitate the above-mentioned functionality the hardware security module 105 stores, in its internal storage 107, multiple instances of a data structure called "Organization," i.e., one instance for each customer of the Cryptoasset Custodian. In one implementation, the Organization data structure can contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies, including one policy for each possible action that may be carried out (e.g., add user or change vault policy). An Organization data structure is signed by the hardware security module 105, using the Organization's private key (which cannot be read by any external entity), to indicate that it was produced through a valid set of changes authorized by the users and risk reviewers. In some embodiments, the hardware security module 105 keeps track of the most recent version to prevent rollback attacks. In other embodiments, the hardware security module 105 code is versioned and there are checks in the upgrade process to prevent rollback attacks.

To onboard a new customer, the hardware security module 105 creates a new Organization instance. To help ensure adequate security, the hardware security module 105 may create the Organization for a requested set of users. In some embodiments, the hardware security module 105 generates new unique keys for every new Organization created. Thus, an attacker is prevented from attempting to spoof or duplicate identities (IDs) with existing organizations, since every organization has a unique organization key.

FIG. 4 illustrates an example of a process that may be performed by the hardware security module 105, in at least some embodiments, in response to a request to carry out an operation. The request may be received by the hardware security module 105 from the relay server 103. Initially, the hardware security module 105 receives (step 401) from the relay server 103 an operation description, which specifies an Organization. The operation description is a set of data and metadata describing a requested operation, such as a requested deposit, withdrawal or transfer of cryptocurrency. The hardware security module 105 verifies (step 402) the integrity of the specified Organization.

The hardware security module 105 looks up the policy in the Organization's or the vault's policy map (step 403). The hardware security module 105 looks at the policy for internal risk reviewers to determine which and how many internal risk endorsements (i.e., endorsements by personnel of the Cryptoasset Custodian) must be fulfilled (step 404). The hardware security module 105 can determine (step 405) whether any of the received cryptographic endorsements (from users) indicate to "REJECT" the requested operation. If so, the hardware security module 105 can reject (step 411) the requested operation, by returning a "REJECT" message to the relay server, which returns a corresponding "REJECT" message to the server computer, to cause notification to the requester. The hardware security module 105 does not bother checking any further signatures and just rejects the operation.

The hardware security module 105 determines (step 406) whether all of the received cryptographic endorsements for the transaction are valid. The determination includes verifying the validity of the cryptographic endorsements provided by checking that: i) the user is in the Organization, ii) the signature is correct for the specified operation, and iii) each of the signatures has an "APPROVE" decision. If not all of the received cryptographic endorsements for the transaction are valid, the process proceeds to step 411 as described above.

If all received cryptographic endorsements for the transaction are valid, the hardware security module 105 determines (step 407) whether the cryptographic endorsements satisfy the relevant policy for the subject cryptoasset (i.e., satisfy the specified quorum). If the valid cryptographic endorsements do not satisfy the policy, the process proceeds to step 411 as described above. If the cryptographic endorsements satisfy the policy, the hardware security module 105 determines (step 408) whether the requested operation passed the risk analysis module 104. If not, the process proceeds to step 411 as described above. If the requested operation passed the risk analysis module 104, the hardware security module 105 determines (step 409) whether the requested operation is valid. The determining step can include verifying that the operation is internally consistent and that the operation can be applied to the Organization, vault or cryptoasset that it targets. If the requested operation is not valid, the process proceeds to step 411 as described above. Otherwise, the hardware security module 105 executes (step 410) the requested operation (or triggers an action to cause it to be executed). An operation to change the Organization, vault or policy results in a new signed Organization data structure with a higher generation value and the change applied to it. An operation to withdraw cryptoassets results in the hardware security module 105 signing a blockchain transaction with the private key corresponding to the subject cryptoasset. An operation to deposit cryptoassets results in the hardware security module 105 generating a deposit address.

Figure 5:
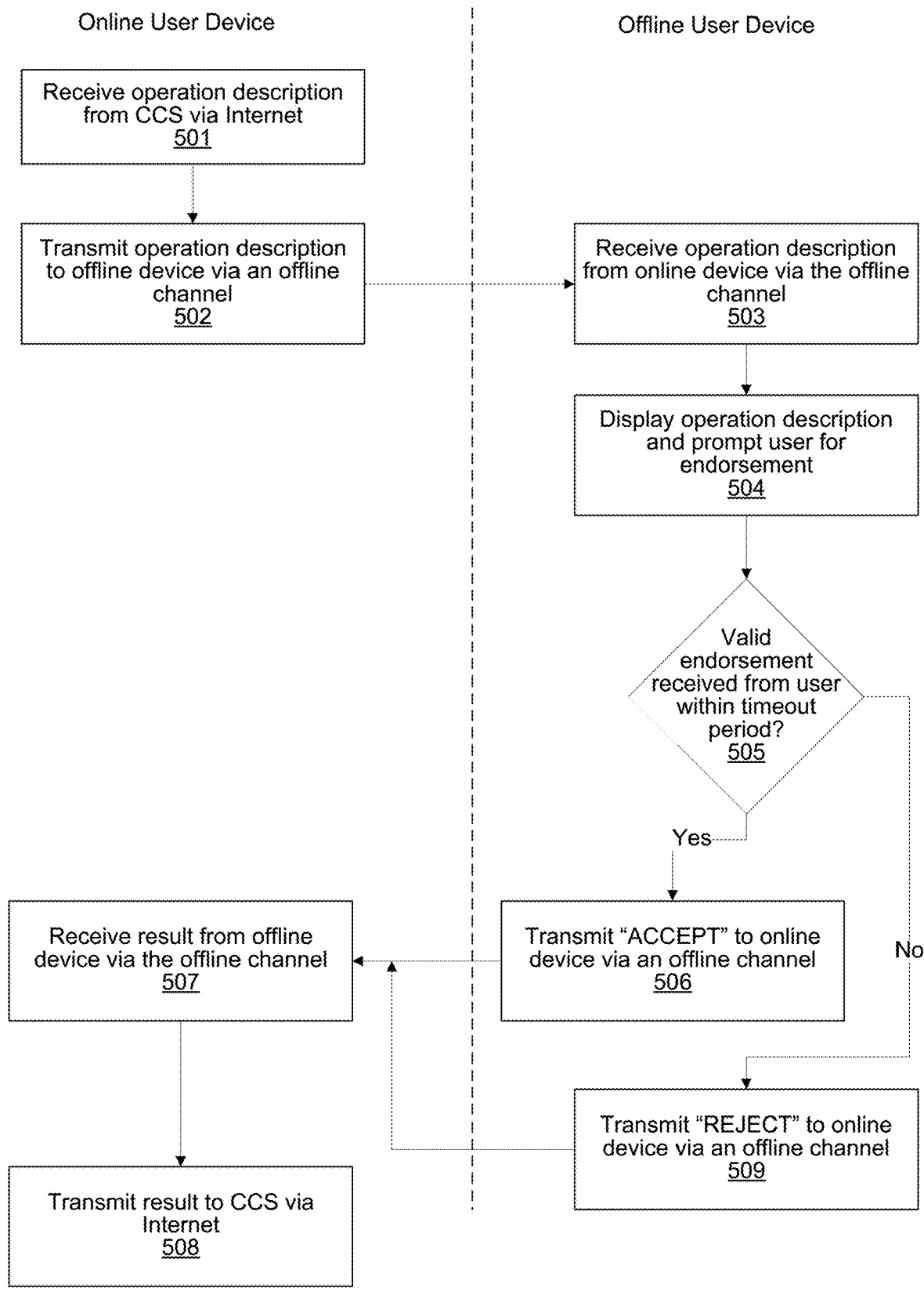
FIG. 5 is a flow diagram illustrating an example of a process for using an offline user device to endorse a requested transaction.

FIG. 5 is a flow diagram illustrating an example of a process for using an offline user device to endorse a requested transaction. As a method for reducing the risk for users interacting with the cryptoasset custodial system application on their personal devices, the cryptoasset custodial system 100 may require authorization from an offline device. The offline device, such as a consumer phone with secure enclave or similarly capable computing device such as an iPod Touch or personal digital assistant, will be completely disconnected from the Internet in its normal state, and used in an offline manner to sign transactions required for authorization.

The process may be carried out as follows. The user has a phone or similar device that is a member of his or her vault policy's quorum and is not connected to any wireless or cellular networks. The device runs software similar to the cryptoasset custodial system application software for enabling a user to endorse requested transactions, or the same software operating in a different mode. The user initiates a transaction against his or her vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. The transmitting can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the server computer of the cryptoasset custodial system 100.

In FIG. 5, an online user device receives (step 501) an operation description from the cryptoasset custodial system 100 via the Internet. The online user device (e.g., user device 108) transmits (step 502) the operation description (or a portion thereof) to the offline user device using an offline channel. As noted above, the offline channel is a channel that is not accessible via the Internet, such as a local visual display by the online user device, a sound or sequence of sounds generated by the online user device, or a short range wireless transmission from the online user device (e.g., via Bluetooth). The offline user device receives the operation description (step 503) from the online user device via the offline channel, and based on the information thereby received, displays the operation description (or portion thereof) and prompts the user for endorsement of the operation (step 504). If a valid endorsement is received by the offline device (step 505) as user input within a timeout period, the offline device transmits an "ACCEPT" message (step 506) to the online user device via the same offline channel by which it received the operation description, or via a different offline channel. The online user device receives the results of the cryptographic endorsement from the offline device (step 507) and transmits the result payload to the cryptoasset custodial system via the Internet (step 508). If a valid cryptographic endorsement is not received by the offline user device from the user within the timeout period (step 505), the offline user device transmits a "REJECT" message to the online user device via the offline channel, which in turn transmits the "REJECT" payload to the cryptoasset custodial system via the Internet (step 508).

The offline device may be delivered to the user with its secure key pre-enrolled in the Organization, or it may be allowed to be online for the initial enrollment process, or it may send its enrollment through a similar procedure to the authorization process.

The cryptoasset custodial system software on the offline device may need to be updated periodically. In some embodiments, to allow such updates the offline device is scheduled to connect to the Internet via Wi-Fi and have its software updated at a predefined cadence. In other embodiments, the offline device detects that its software needs to be updated as a result of receiving a transaction to sign from the online user device that indicates that the version of the software on the offline device is no longer compatible. Whenever the device is online, it can record as well as attempt to transmit to the cryptoasset custodial system 100 the fact that it can access the Internet so that that information may be used to assess risk by the platform at a later time. In other embodiments, the offline device does not require Wi-Fi. For example, the offline device connects to a laptop that is capable of updating its software.

In addition to being kept offline, the offline user device and one or more online devices may be restricted to act on a transaction only when in range of a predefined beacon. A wireless (e.g., Bluetooth) beacon device can be made available to the user, and the cryptoasset custodial system 100 application may refuse to authorize transactions unless it detects that the beacon is available.

Every transaction submitted to the cryptoasset custodial system 100 is recorded in an internal ledger that is tamper-resistant and that allows auditors to have cryptographic proof of every historical event on every user's account. The ownership of a blockchain cryptoasset is controlled by the possession of the private key corresponding to the public wallet address. The cryptoasset custodial system 100 can prove ownership of these cryptoassets to auditors by making use of the private key corresponding to a user's vault to sign a string of randomly chosen text chosen by the auditors. Consider the following example:

An auditor wishes to see proof that the cryptoasset custodial system 100 has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

```
{
    Address: 1BvBMSEYstn5Au4m4GFg7yJaNVN2 ,
    Token: " AUDIT-CHALLENGE- xGG8vQFnd8QDwHz6Uj1GX",
}
```

The cryptoasset custodial system 100 receives the challenge and forwards it to the hardware security module 105 as a predefined templated serialized package. The hardware security module 105 is programmed to accept and sign such audit requests (which are not arbitrary payloads and therefore are not at risk of being later interpreted as a signed blockchain transaction) with the private key associated with the specified address. The cryptoasset custodial system 100 returns the valid signature for the challenge that can be independently verified by the auditor. The verification proves that the cryptoasset custodial system 100 has control over a private key associated with an entry on the blockchain, achieving proof of control of the cryptoasset.

In certain embodiments, the cryptoasset custodial system 100 includes a Thresholding Service that enables other parts of the system (risk analysis module 104 and hardware security module 105) to securely determine that user operations and transactions have followed the customer specific business logic and have been approved by an automated risk review system. The Thresholding Service can verify multi-signature (multi-user) quorums.

The Thresholding Service validates operations initiated and approved by users to ensure that they've met a threshold quorum before being executed. Such operations may include transactions, or adding or removing other users. Different users can have different access control roles (e.g., view-only, initiate-transaction-only, authorizable, necessary). The cryptoasset custodial system 100 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 100 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The cryptoasset custodial system 100 may also allow thresholding across multiple required groups. For example, in a company a majority of the finance team may be required to sign off, as well as the front office.

In certain embodiments, the Thresholding Service implements a fine-grained access control model in its quorum verification, in which different users can have different access levels, which may include the following levels, for example:

View-only
  This is the default access level
  Users in this level can view all cryptoasset positions
  Users in this level can flag any transaction
  Users in this level can freeze all cryptoassets
View-authorize
  Users in this level can act as an authorizing vote for an action toward a quorum
  Users in this level can view all cryptoasset positions
  Users in this level can flag any transaction
  Users in this level can freeze all cryptoassets
View-authorize-necessary
  Users in this level are a required vote for an action
  Users in this level can view all cryptoasset positions
  Users in this level can flag any transaction
  Users in this level can freeze all cryptoassets In certain embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In certain embodiments, a user's signature is generated from an iOS secure enclave in the user's mobile device, and forwarded to the cryptoasset custodial system 100 by the iOS application programming interface (API) component in the user device 108. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the risk analysis module 104 to be further analyzed before sign-off by the risk analysis module 104, and will serialize the signature data into a payload to be consumed by the hardware security module 105 signing service. Each additional signature provided to the Thresholding Service and verification can be recorded in the append-only log service. The recording will provide additional auditing and status updates in addition to the metadata captured in the Thresholding Service's storage, which will be essential for providing consumable updates to user clients.

It is assumed that authorized members of a quorum are available to cryptographically sign transactions. Therefore, the quorum should be kept "live"—that is, at any given time, the cryptoasset custodial system 100 has reasonable confidence that all potential members of the quorum maintain possession of their secure device keys and can actively participate in a transaction. In certain embodiments, the cryptoasset custodial system 100 can do the following to achieve a level of confidence:

1. Have access to the set of user public keys required to fulfill a policy's quorums.
2. Set a liveness threshold for a policy, i.e., the amount of time after which one considers a key to be at risk of unavailability. Can be fixed or related to normal transaction cadence.
3. Require users to periodically sign a proof transaction with their private keys. Can be explicit as a liveness check or hidden/implicit by requiring their key for routine operations such as login.
4. Record the latest live time of any one or more users' keys.
5. Continuously monitor whether any user's live time has exceeded the liveness threshold.
6. Use the above information to prompt the user to prove they still have access to their signing key and/or inform other users that the quorum may be at risk.

The risk analysis module 104 can implement an API, called the Risk API, and can further include review of all transactions and administrative user operations. In some embodiments the Risk API drives the review system. The Risk API can provide integration with an internal risk dashboard, for review of each transaction.

In certain embodiments, all transactions are manually approved by designated employee(s); all administrative user operations (adding, removing, permission changes) are manually approved by designated Cryptoasset Custodian employee(s); reviewable entities must have passed an automated verification process before requiring risk analysis; reviewable entities must provide robust context about the user approvals, for further automated inspection; and risk approvals and denials are logged in an append-only ledger for auditability.

The Risk API reverifies the appropriate threshold as determined by the Thresholding Service. The Risk API may also handle additional business logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a classification system. The data can include, for example, user(s) who approved the transaction, time of approval(s), location of approval(s), and device/key ID(s) that approved the transaction. The data can be fed into an internal Risk Analysis dashboard, and possibly other automated review systems.

In some embodiments, the Risk API requires approval if a transaction passes the automated risk review. To approve, an employee may be required to sign with a cryptographic key if he or she approves the transaction/operation and present the signature to the Risk API for validation. Moreover, there are preferably multiple keys, one per risk reviewer, such that it is logged who performed the review. Preferably it is made easy to rotate a risk-approval key in case of compromise.

Figure 6:
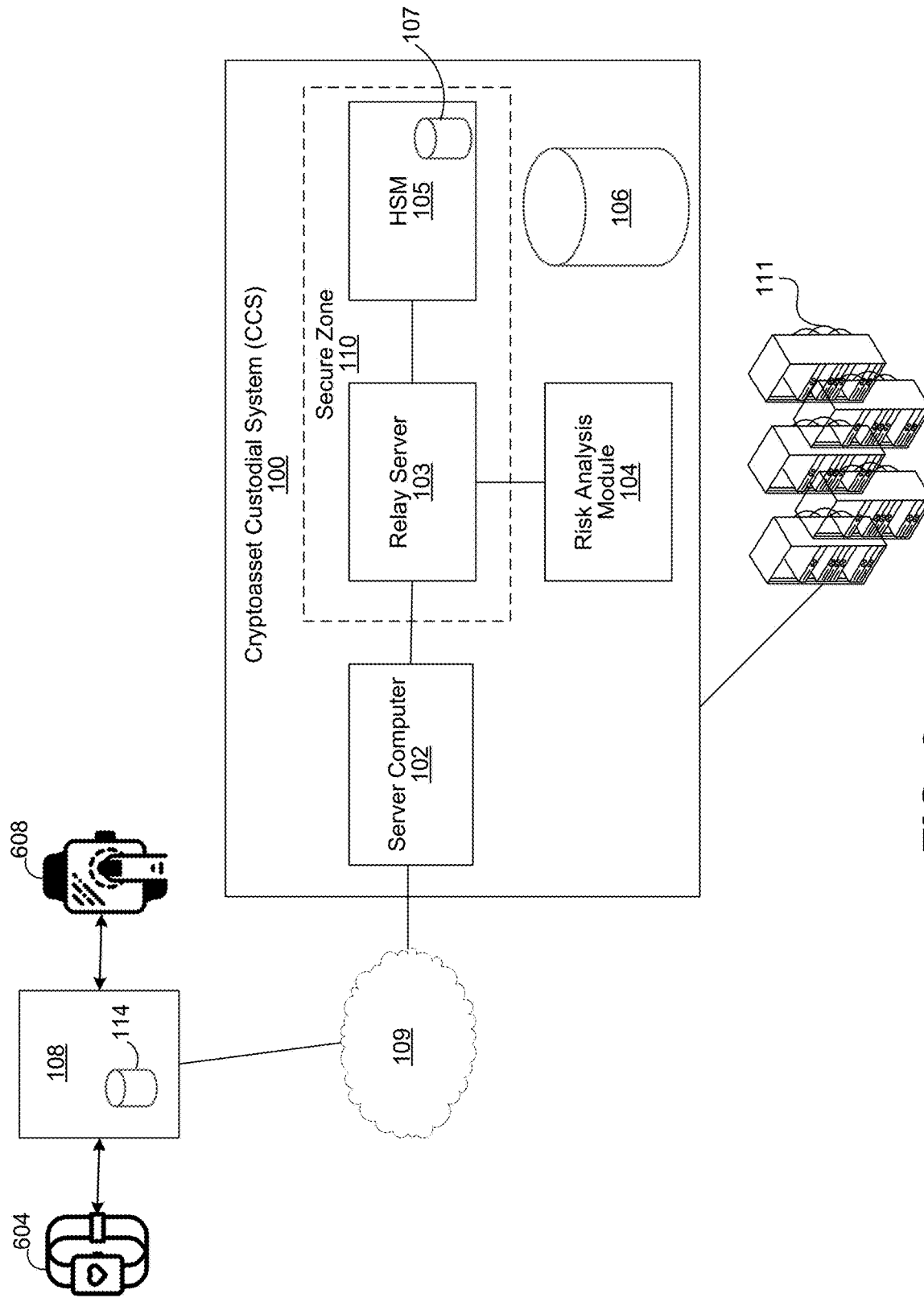
FIG. 6 illustrates an example block diagram of a cryptoasset custodial system performing risk mitigation using data points from mobile devices.

FIG. 6 illustrates an example block diagram of a cryptoasset custodial system 100 performing risk mitigation using data points from mobile devices 604, 608. The cryptoasset custodial system 100 includes the server computer 102, the relay server 103, the hardware security module 105, the risk analysis module 104, and the data storage facility 106 as described in more detail with reference to FIG. 1.

The server computer 102 is a computer device including software that provides functionality for client programs and devices, for example, the user device 108. The server computer 102 provides different functionalities, such as requesting the user devices 108 to endorse a cryptoasset transaction, communicating with the hardware security module 105, and performing cryptoasset transactions on the blockchain 111 in response to a client request. For example, the server computer 102 transmits an endorsement request for a cryptoasset transaction to be performed by the server computer 102 on a blockchain 111 to multiple user devices 108. A user device 108 can be a smartphone, tablet, laptop computer, or desktop computer. Each user device 108 is communicably coupled to the server computer 102, e.g., using the network 109. The network 109 is a public computer network, such as the Internet as illustrated and described in more detail with reference to FIG. 1. Each user device 108 is associated with a user of the cryptoasset custodial system 100.

The endorsement request is configured to cause each user device 108 to prompt its user to endorse the cryptoasset transaction. Each user has been defined as a potential member of a quorum for transactions involving a cryptoasset. An endorsement in such a context is an approval or rejection of an operation by a user. When a user receiving such a prompt endorses the transaction on his or her user device 108, the user device 108 signs a cryptographic endorsement with a private key of that user and transmits the signed cryptographic endorsement to the server computer 102. The private key is stored within a secure enclave 114 within the user device 108. The secure enclave 114 in each user device 108 is used to store the corresponding user's private key and to generate digital signatures of that user.

The mobile devices 604, 608 are smartphones, wearable technology devices, or smart electronic devices that can be incorporated into clothing or worn on the body as implants or accessories. The mobile devices 604, 608 include microprocessors, application-specific integrated circuits, touchscreens, or GPS receivers to provide different functionality. The mobile devices 604, 608 can be an implementation of the Internet of Things that enable objects to exchange data through the Internet with a connected device (e.g., the user device 108) without requiring human intervention. Each mobile device 604, 608 is communicably coupled to the user device 108, e.g., using Bluetooth, Wi-Fi, radio frequency communication, the network 109, or a combination thereof. Each mobile device 604, 608 is associated with a user with whom the user device 108 is associated.

The mobile device 604 can be an activity tracker or fitness tracker that monitors and tracks fitness-related metrics of the user such as distance walked or ran, calorie consumption, and in some cases heartbeat. The smartwatch 608 is a wearable computer in the form of a wristwatch that provides a local touchscreen interface and includes an associated smartphone app for management and telemetry (such as long-term biomonitoring). Other examples of mobile devices that can be part of some or all of the embodiments disclosed herein are devices that perform tasks, such as calculations, digital time telling, translations, game-playing, and can include mobile apps, a mobile operating system and WiFi/Bluetooth connectivity. Other examples of mobile devices include portable media players, with FM radio and playback of digital audio and video files via a Bluetooth headset.

In some embodiments, a user is prompted by the user device 108 to allow the capture of one or more data points when endorsing a cryptoasset transaction. For example, the user may be prompted to take a picture of her face using the user device 108 or a mobile device, e.g., such as 604, 608. The picture is thus a data point. In other embodiments, once the user has given consent, the mobile devices 604, 608 can collect multiple data points associated with the user. The data points indicate an identity of the user. For example, the smartwatch 608 or the fitness tracker 604 can include a global positioning system (GPS) receiver. The GPS receiver measures a geographical location (co-ordinates) of the smartwatch 608 or the fitness tracker 604. Thus the data points can include geolocation and time information. The data points can include an identification number of one of the mobile devices 604, 608. For example, the identification number can be the mobile identification number (MIN) or mobile subscription identification number (MSIN), which is a 10-digit unique number that a wireless carrier uses to identify a smartphone.

The data points can include an altitude of the mobile device 604, 608 relative to sea level measured by a GPS receiver or a barometer sensor of the mobile device 604, 608. For example, the mobile device 604, 608 can determine the device's distance from the center of the orbit of the GPS satellites to determine the altitude. The data points can include a service set identifier (SSID) of a wireless network to which the mobile device 604, 608 is connected. The SSID refers to the identifier of a Wi-Fi network. The mobile device 604 or user device 108 can further be connected to a printer on the SSID. Thus the data points can further include an identifier or IP address of the connected printer. The data points can include a Bluetooth device address of the mobile device 604, 608. The Bluetooth device address (or BD ADDR) is a unique 48-bit identifier assigned to each Bluetooth device by the manufacturer.

The data points can include biometric data of the user captured by the user device 108 or mobile devices 604, 608. The biometric data can include a heart rate, temperature, voice sample, photograph, or video recording of the user. Additional examples of data points are described in more detail with reference to FIG. 3B. In some embodiments, the data points captured by the mobile devices 604, 608 are transmitted to the user 108, which transmits the data points to the server computer 102. In other embodiments, the mobile devices 604, 608 can directly transmit the data points to the server computer 102, once the user device 102 notifies the mobile devices 604, 608 of the endorsement request.

The data points can include an amount of the transaction expressed in US dollars, another currency, or a cryptocurrency. For example, once a withdrawal request is received, the risk analysis module 104 can plot the amount of the withdrawal requested as well as the previous withdrawal amounts on a scatter plot. The scatter plot can include, for example, the USD valuation on a Y axis and the time on an X axis. The current and pending withdrawal is highlighted such that the risk analysis module 104 can determine whether the current withdrawal request amount is an outlier or is suspiciously high. In some embodiments, the data points as well as a trend in the data points is displayed in the form of a graphical user interface on a risk review dashboard. The trend can be displayed graphically as a scatter plot, histogram, bar chart, line graph, or pie chart. The graphical user interface allows interaction with the risk review dashboard through graphical icons and visual indicators such as secondary notations, text-based user interfaces, typed command labels, or text navigation. An approver can detect whether a data point matches the expected value before signaling their approval of the cryptoasset transaction.

The risk analysis module 104 performs a risk-based review of communications (endorsements, approvals) of cryptoasset transactions before the transactions can be performed. The risk analysis module 104 is illustrated and described in more detail with reference to FIG. 1 and can be implemented in hardware or software. The risk analysis module 104 is communicably coupled to the server computer 102. The risk analysis module 104 generates a graphical visualization of the data points on a risk review dashboard. An automated risk analysis agent can evaluate the risk review dashboard to make a decision on whether the cryptoasset transaction has been sufficiently authorized to be accepted.

The graphical visualization can include a risk metric based on the plurality of data points. The risk metric indicates a risk of accepting a cryptographic endorsement of the cryptoasset transaction from the user device 108. The risk metric can be a number between 0 and 100 (0 indicating minimal risk and 100 indicating maximal risk) or a number between 0.00 and 1.00. In some embodiments, the risk metric is a vector including risk scores in different categories (e.g., the risk that a malicious actor has possession of a mobile device 604 of the user, the risk that the cryptographic endorsement is spoofed, the risk that a mobile device is malfunctioning).

Generating the graphical visualization includes determining whether certain data points match expected values of the multiple data points. For example, if the user is carrying the user device 108 and wearing the smartwatch 604, the GPS location reported by each device would be expected to be the same. If the locations mismatch, the risk metric is increased. The graphical visualization can include a trend of the data points changing over time. If there is a large change in biometrics measured by a mobile device 604, 608 compared to values measured over time, the risk metric is increased. For example, if a user's heart rate is historically 80 and a smartwatch measures the heart rate as 95, a mismatch is detected. The risk analysis module 104 can thus predict the expected value of each data point based on the trend.

In some embodiments, the server computer 102 transmits an endorsement request for a cryptoasset transaction to the user device 108. The endorsement request is configured to cause the user device 108 to prompt a user to endorse the cryptoasset transaction. The server computer 102 receives multiple data points collected from one or more mobile devices, e.g., 604, 608. The data points indicate an identity of the user. The risk analysis module 104 generates a graphical visualization of the multiple data points on a risk review dashboard. The graphical visualization can include a scatter plot, a histogram, a bar chart, a line graph, a pie chart, or another form of graphical visualization. The graphical visualization can be reviewed by a risk expert or the graphical visualization can be transmitted to another entity for review.

In some embodiments, the server computer 102 receives the multiple data points collected from the one or more mobile devices as described above. The risk analysis module 104 generates a risk metric based on the multiple data points. The risk metric indicates a risk of accepting the cryptographic endorsement of the cryptoasset transaction from the user device 108. To generate the risk metric, the risk analysis module 104 can determine whether the data points match expected values. For example, the risk metric can be a function of a difference between the measured value of a data point and the expected value. The risk analysis module 104 can also compute a trend of multiple data points and determine the expected value of the data points based on the trend. Each mobile device, e.g., 604, 608, can have a required status or a non-required status. The risk analysis module 104 can thus detect absence of a data point from a particular mobile device, where the particular mobile device is assigned the required status. In such a situation, the risk analysis module 104 can increase the risk metric responsive to detecting the absence. The hardware security module 105 can be configured to receive the cryptographic endorsement of the cryptoasset transaction from the server computer 102 via the relay server 103, responsive to the risk metric being below a threshold value.

In some embodiments, the risk analysis module 104 registers each mobile device, e.g., 604, 608, associated with the user on the cryptoasset custodial system 100 prior to receiving the data points. Registering a mobile device, e.g., 604, 608, is performed responsive to receiving a registration request from the user device 108. The registration request associates the user of the cryptoasset custodial system 100 with each mobile device 108. For example, data associating an identification number of the user device 108 with an identification number of the mobile 604, 608 can be stored in the data storage facility 106. If the server computer 102 receives a data point from an unregistered mobile device, the risk metric is increased, reflecting that a hacker may be tampering with the cryptoasset custodial system 100.

In some embodiments, registering a mobile device 604, 608 includes assigning a required status or a non-required status to the mobile device 604, 608. The required status may be denoted by a binary "1" value encoded into the registration process. The non-required status may be denoted by a binary "0" value encoded into the registration process. For example, it may be required that the user always carry his or her smartwatch 608 but it may not require that the user always wear his or her fitness tracker 604. The risk analysis module 104 detects absence of a data point collected from a mobile device 608, wherein the mobile device 608 is assigned the required status (binary "1"). For example, the risk analysis module 104 detects that no data has been received from the smartwatch 608. The risk analysis module 104 increases the risk metric responsive to detecting the absence of a signal from such a device.

In some embodiments, the risk analysis module 104 detects a mismatch between a first data point and a second data point of the plurality of data points, the first data point collected from a first mobile device of the one or more mobile devices and the second data point collected from a second mobile device of the one or more mobile devices. For example, the smartwatch 608 can measure the heart rate of the user as a certain value, R1. The fitness tracker 604 can measure the heart rate of the user as another value, R2. If there is a significant difference, for example a difference of 50, between R1 and R2, the risk analysis module 104 increases the risk metric.

In some embodiments, the risk analysis module 104 includes a feature extraction module and a machine learning module communicably coupled to the feature extraction module. The feature extraction module extracts or determines one or more feature vectors from the data points. The feature extraction may be implemented in software or in special-purpose hardware as described below with reference to FIG. 8. The feature extraction module reduces redundancy in the data points by transforming the data points into a reduced set of features (the feature vector). In some embodiments, the following dimensionality reduction techniques can be used by the feature extraction module to reduce a dimensionality of the feature vector: independent component analysis, Isomap, Kernel PCA, latent semantic analysis, partial least squares, or multifactor dimensionality reduction. The feature vector contains the relevant information from the data points, such that features of interest are identified by the machine learning module using the reduced representation instead of the data points.

The machine learning module generates the risk metric based on the feature vector. The machine learning module is trained to indicate the risk of accepting the cryptographic endorsement based on whether the multiple data point match expected values of the multiple data points. The machine learning module includes a mathematical and connectivity model that is trained to make predictions or decisions without being explicitly programmed. The cryptoasset custodial system 100 can use one or more machine learning methods to train the machine learning module. In one embodiment, a k-nearest neighbors method is used. The k-nearest neighbors method can be used for classification and regression. For both classification and regression, a training data set consists of the k closest training examples in the feature vector space. In some embodiments, a support vector machine method is used. Support vector machines use supervised learning to train the machine learning module with associated learning algorithms that analyze the feature vector that is used for classification and regression analysis. The machine learning module is presented with a set of training examples, each marked as belonging to one or the other of two categories. The support vector machine method trains the machine learning module to assign new examples to one category or the other, making it a non-probabilistic binary linear classifier.

If the risk analysis module 104 determines that the risk metric is below a threshold risk metric, the server computer 102 transmits the cryptographic endorsement of the cryptoasset transaction to the hardware security module 105 through a relay server 103 communicably coupled to the server computer 102. The relay server 103 is illustrated and described in more detail with reference to FIG. 1. For example, for a risk metric range of 0-100 (where 0 indicates lower risk), the threshold risk metric can be selected to be 10 for more secure operation. Only when the risk metric is determined to be less than 10, will the server computer 102 transmit the cryptographic endorsement of the cryptoasset transaction to the hardware security module 105. The threshold risk metric can be set higher for less secure operation. The threshold risk metric can be determined based on historical data and the trend in data point values.

The hardware security module 105 is a special-purpose physical computing device that safeguards and manages digital keys for authentication and provides a secure execution environment. The hardware security module 105 is illustrated and described in more detail with reference to FIG. 1. The hardware security module 105 is communicably coupled to the relay server 103. The hardware security module 105 receives the cryptographic endorsement of the cryptoasset transaction from the relay server 103. The hardware security module 105 generates a cryptographic key associated with the cryptoasset transaction. The generation of the cryptographic key is described in more detail with reference to FIGS. 1, 2B, and 3B. The cryptographic key is usable to control access to the blockchain 111. The blockchain 111 is described in more detail with reference to FIG. 1.

The data storage facility 106 may include one or more databases, which can be or include relational databases or any other type of mechanism for storing data of the cryptoasset custodial system 100 in an organized way, where the data may be structured data and/or unstructured data. The data storage facility 106 is illustrated and described in more detail with reference to FIG. 1.

Figure 7:
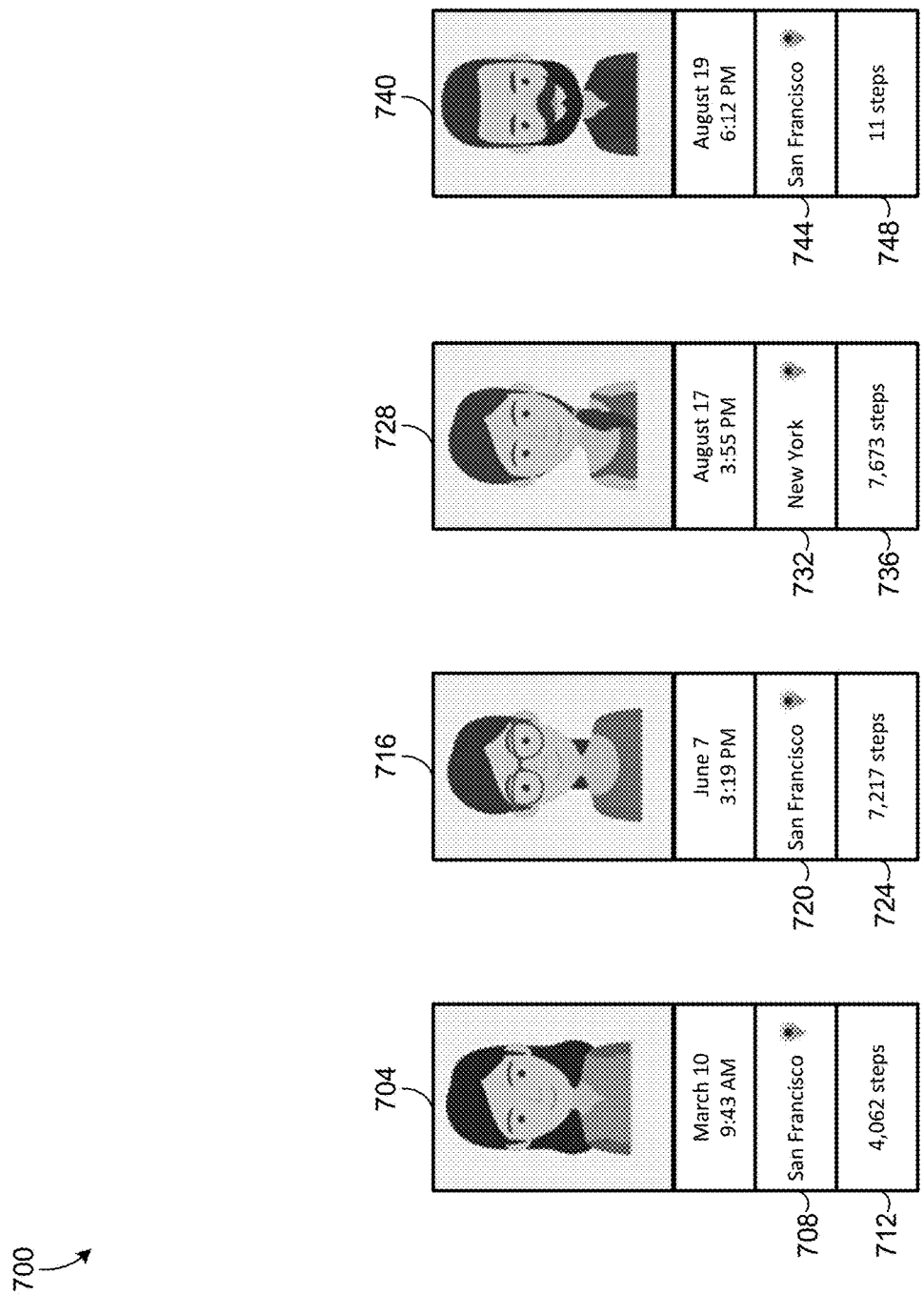
FIG. 7 illustrates a trend in data points collected from a mobile device.

FIG. 7 illustrates a trend 700 in data points collected from mobile devices 604, 608. The mobile devices 604, 608 are illustrated and described in more detail with reference to FIG. 6. The trend 700 shows different data points captured at four different points in time. The data point 704 is an image of the user captured at 9:43 AM on March 10 when the user endorsed a first cryptoasset transaction. The data point 704 appears to be an image of a woman. The image 704 would thus be the expected value of an image of the user when the data point 716 is captured at the second point in time. The data point 708 is the location of the user (or at least of the capturing device) detected at 9:43 AM on March 10 when the user was endorsing the first cryptoasset transaction. The data point 708 shows the location of the user as San Francisco. San Francisco would therefore be the expected value of the location when next detected (e.g., data point 720). The data point 712 captures the number of steps the user walked by 9:43 AM on March 10 when the user was endorsing the first cryptoasset transaction. The number of steps can be captured by the fitness tracker 604 of FIG. 6. The data point 712 shows the number of steps as 4,062. Other data points, as described with reference to FIG. 6, can be captured or collected. The user device 108 or server computer 102 can also derive metrics from the collected data points. For example, the number of steps walked can be converted into a steps-per-hour or steps-per-minute metric, such that the metric can be normalized against the capture time. Thus, the number of steps 4,062 can be divided by 9 hours and 43 minutes to derive a steps-per-minute metric of 4,062/583 or 6.97 steps/minute, where 9 hours 43 minutes equals 583 minutes.

The data point 716 is an image of the user captured at 3:19 PM on June 7 when the user was endorsing a second cryptoasset transaction. In the image 716, the user is wearing glasses. The risk analysis module 104 determines whether the image 716 matches the expected value (the face in image 704) by, for example, image processing and facial recognition. The data point 720 is the location of the user detected when the user was endorsing the second cryptoasset transaction. The data point 720 shows the location of the user as San Francisco. The location 720 matches the expected value (San Francisco). The data point 724 captures the number of steps the user walked by the time the user endorsed the second cryptoasset transaction. The data point 724 shows the number of steps as 7,217. Although the number of steps 7,217 does not equal 4,062, the risk analysis module 104 can determine it is a match based on the capture time. For example, the number of steps 7,217 can be divided by 15 hours and 19 minutes (3:19 PM) to derive a steps-per-minute metric of 7,217/919 or 7.85 steps/minute, where 15 hours 19 minutes equals 919 minutes past midnight of the previous day. In some embodiments, the risk analysis module 104 may set a threshold value for the difference from the expected value, above which the endorsement can be rejected. For example, a threshold of 100 steps/minute can be set. Here, the difference 7.85–6.97 is less than 100. Hence, the data point 724 is determined to match the data point 712. The threshold can be set lower for a stricter match or higher for a more lenient match. Because the data points 716, 720, 724 match the expected values based on the data points 704, 708, 712 the cryptographic endorsement is accepted.

The data point 728 is an image of the user captured at 3:55 PM on August 17 when the user endorsed a third cryptoasset transaction. In the image 728, the user is not wearing glasses but the image 728 appears to be of the same woman. The risk analysis module 104 determines a match by, for example, image processing and facial recognition based on the data points 704, 716 (expected value). The data point 732 is the location of the user detected at 3:55 PM on August 17. The data point 732 shows the location of the user as New York. The location 732 therefore does not equal the expected value (locations 708, 720). However, the mismatch in location can be ignored if sufficient other data points match, the risk analysis module 104 determines the user has logged in from New York in the past, or if other identifiers of the user (e.g., a residence or office address) are in New York. The data point 736 captures the number of steps the user walked by 3:55 PM on August 17. The data point 736 shows the number of steps as 7,673. The risk analysis module 104 can determine it is a match if the difference is below a threshold difference from an expected value (e.g., an average of 7.85 and 6.97 steps/minute).

The data point 740 is an image of the purported user captured at 6:12 PM on August 19 when the user is endorsing a fourth cryptoasset transaction. The image 740 is of a person who has a mustache and a beard, and appears to be an image of a man. The risk analysis module 104 determines that the data point 740 does not match the expected value. The data point 744 is the location of the user detected at 6:12 PM on August 19 when the user was endorsing the fourth cryptoasset transaction. The data point 744 shows the location of the user as San Francisco. The location 744 therefore matches the expected value (locations 708, 720). However, another data point that mismatches strongly can overrule the location match. For example, the data point 748 captures the number of steps the user has walked by 6:12 PM. The data point 748 shows the number of steps as 11. The risk analysis module 104 can determine a mismatch since the steps/minute metric derived is 11/1092 or 0.01 steps/minute, where 1092 minutes equals 18 hours and 12 minutes past midnight (6:12 PM). The metric 0.01 steps/minute is very different from an expected value of approximately 7 steps/minute. Because the data points 740, 748 mismatch the expected values based on the data points previously collected, the cryptographic endorsement is rejected. The cryptoasset custodial system 100 can investigate further, contact the user to collect more information, or rely on other data points, such as the SSID of the Wi-Fi network the mobile device 604 is connected to, other biometric data, make and model of smartphone, identifier of a mobile device, or the Bluetooth address of a mobile device of the user.

Figure 8:
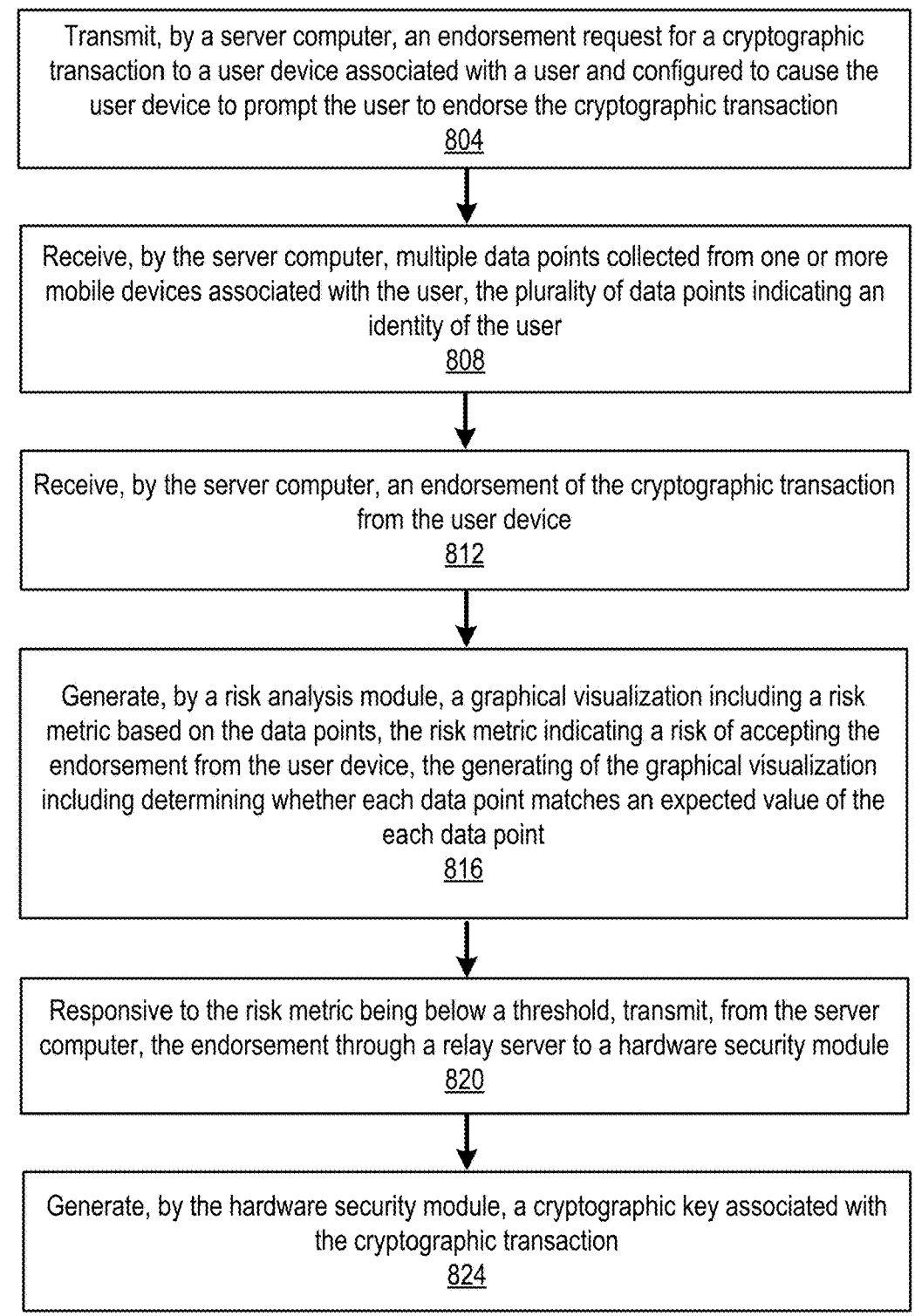
FIG. 8 illustrates a process for risk mitigation for the cryptoasset custodial system.

FIG. 8 illustrates a process 800 for risk mitigation for the cryptoasset custodial system 100. The cryptoasset custodial system 100 is illustrated and described in more detail with reference to FIGS. 1 and 6. In some embodiments, the process 800 of FIG. 8 is performed by the cryptoasset custodial system 100. Other entities, for example, a user device 108 or a mobile device 604, perform some or all of the steps of the process 800 in other embodiments. The user device 108 is illustrated and described in more detail with reference to FIG. 1. The mobile device 604 is illustrated and described in more detail with reference to FIG. 6. Likewise, embodiments may include different and/or additional steps, or perform the steps in different orders.

The cryptoasset custodial system 100 transmits 804 an endorsement request for a cryptoasset transaction to a user device 108 associated with a user of the cryptoasset custodial system 100. The endorsement request is transmitted by the server computer 102 of the cryptoasset custodial system 100, for example, the server computer 102. The server computer 102 is illustrated and described in more detail with reference to FIGS. 1 and 6. The user device 108 is communicably coupled to the server computer 102. The cryptoasset transaction is to be performed by the server computer 102 on a blockchain 111. The blockchain 111 is illustrated and described in more detail with reference to FIG. 1. The endorsement request is configured to cause the user device 108 to prompt the user to endorse the cryptoasset transaction.

The cryptoasset custodial system 100 receives 808 multiple data points using the server computer 102. The data points are collected from one or more mobile devices, e.g., 604, 608, communicably coupled to the user device 108. The one or more mobile devices, e.g., 604, 608 are associated with the user. The multiple data points can indicate an identity of the user. For example, a mobile device 608 can be a smartwatch of the user. The data points can include a geographical location of the smartwatch 608 measured by a global positioning system receiver of the smartwatch 608.

The cryptoasset custodial system 100 uses the server computer 102 to receive 812 the cryptographic endorsement of the cryptoasset transaction from the user device 108. For example, when the user receiving the endorsement request endorses the cryptoasset transaction on his or her user device 108 (e.g., a smartphone, tablet or notebook computer), the user device 108 signs a cryptographic endorsement with a private key of that user and transmits the signed cryptographic endorsement to the server computer 102. The private key can be stored within a secure enclave 114 within the user device 108. The secure enclave 114 in each user device 108 is used to store the corresponding user's private key and to generate digital signatures of that user. The secure enclave 114 is illustrated and described in more detail with reference to FIG. 1.

The cryptoasset custodial system 100 can use a risk analysis module 104 to generate 816 a graphical visualization that can include a risk metric based on the multiple data points. The risk analysis module 104 is illustrated and described in more detail with reference to FIGS. 1 and 6. The risk analysis module 104 is communicably coupled to the server computer 102. The risk metric indicates a risk of accepting an endorsement of the cryptoasset transaction from the user device 108. To generate the graphical visualization, the risk analysis module 104 determines whether the multiple data points match expected values. The graphical visualization can include a trend of the data points changing over time. The risk analysis module 104 can determine the expected value of each data point based on the trend.

Responsive to the risk metric being below a threshold risk metric, the cryptoasset custodial system 100 transmits 820 the cryptographic endorsement of the cryptoasset transaction from the server computer 102 to a hardware security module 105 of the cryptoasset custodial system 100. The hardware security module 105 is illustrated and described in more detail with reference to FIGS. 1 and 6. The transmission is performed through the half-duplex relay server 103 of the cryptoasset custodial system 100. The hardware security module 105 is communicably coupled, by the half-duplex relay server 103, to the server computer 102. The half-duplex relay server 103 is illustrated and described in more detail with reference to FIG. 1.

The cryptoasset custodial system 100 generates 824 a cryptographic key by the hardware security module 105. The cryptographic key is associated with the cryptoasset transaction and is usable to control access to the blockchain 111. For example, the address of a cryptocurrency deposit on the blockchain 111 can be stored in a collection with other addresses belonging to the user in the cryptoasset custodial system 100, known as the customer's "vault." A vault in such a context is a data entity that contains cryptoassets and a policy map containing one or more policies governing deposits and withdrawals from those cryptoassets. A cryptoasset is represented as a slot inside a vault that can hold an amount of a cryptoasset type (e.g., Bitcoin, Ethereum). Once under custody and stored with the cryptoasset custodial system 100, the cryptoasset can be used for a transaction.

Figure 9:
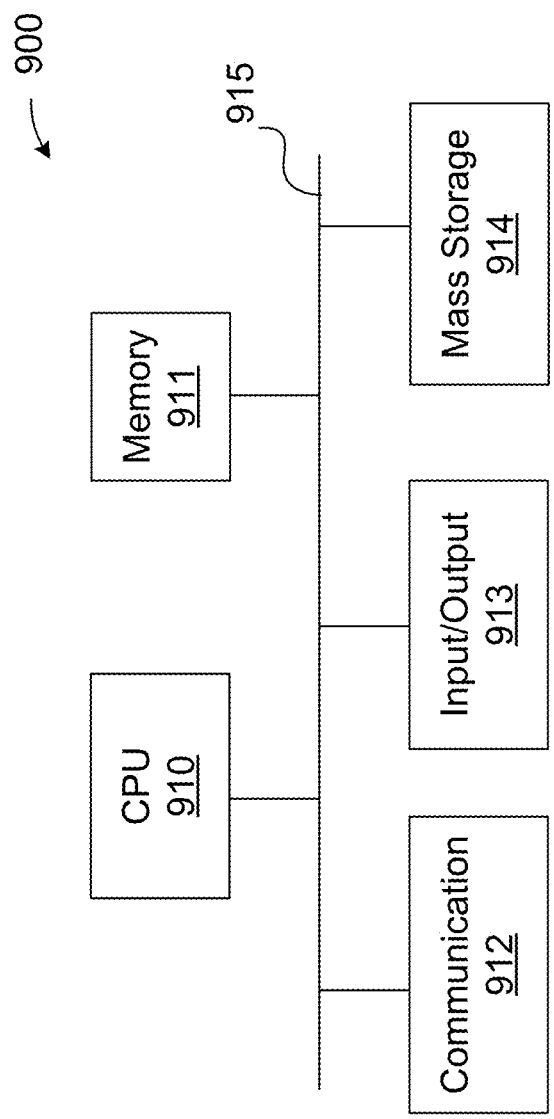
FIG. 9 is a high-level block diagram showing an example of a hardware architecture of a processing system that can be used to implement some or all of the cryptoasset custodial system or a user device.

FIG. 9 is a high-level block diagram showing an example of a hardware architecture of a processing system 900 that can be used to implement some or all of the cryptoasset custodial system 100 or a user device 108. The cryptoasset custodial system 100 can include one or more instances of an architecture such as shown in FIG. 9, where multiple such instances can be coupled to each other via one or more private networks.

The illustrated processing system 900 includes one or more processors, including a CPU 910, one or more memories 911 (at least a portion of which may be used as working memory, e.g., random access memory (RAM)), one or more data communication device(s) 912, one or more input/output (I/O) devices 913, and one or more mass storage devices 914, all coupled to each other through an interconnect 915. The interconnect 915 may be or include one or more conductive traces, buses, point-to-point connections, controllers, adapters and/or other conventional connection devices. Each processor 910 controls part of the operation of the processing device 900 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 911 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 914 can be or include one or more hard drives, digital versatile disks (DVDs), flash memories, or the like. Each memory 911 and/or mass storage 914 can store (individually or collectively) data and instructions that configure the processor(s) 910 to execute operations to implement the techniques described above. Each communication device 912 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 900, each I/O device 913 can be or include a device such as a display (which may include a transparent AR display surface), audio speaker, keyboard, mouse or other pointing device, microphone, or camera. Note, however, that such I/O devices may be unnecessary if the processing device 900 is embodied solely as a server computer.

In the case of a user device, a communication device 912 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 912 can be or include, for example, any of the aforementioned types of communication devices, a wired Ethernet adapter, cable modem, DSL modem, or the like, or a combination of such devices.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), or system-on-a-chip systems (SOCs).

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors). For example, a machine-accessible medium includes recordable/non-recordable media (e.g., RAM or ROM; magnetic disk storage media; optical storage media; or flash memory devices).

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A cryptoasset custodial system comprising:
    a first server computer configured to:
        transmit an endorsement request for a cryptoasset transaction to be performed by the first server computer, the endorsement request transmitted to a user device associated with a user and configured to prompt the user device to sign a cryptographic endorsement of the cryptoasset transaction using a private key associated with the user device;
        receive a plurality of data points collected from one or more mobile devices in communication with the user device, the plurality of data points comprising i) a plurality of biometric data points associated with different biometric categories and ii) an amount of the cryptoasset transaction; and
        receive the cryptographic endorsement of the cryptoasset transaction from the user device;
    a third server computer comprising a risk analysis module, the third server computer in communication with the first server computer and configured to:
        compare each of the plurality of biometric data points to a corresponding historic trend of a plurality of historic trends generated by the third server computer, wherein the biometric data point and the corresponding historic trend being compared to each other are associated with a same biometric category;
        generate a risk metric based at least on the comparison of each of the plurality of data points to the corresponding historic trend of the plurality of historic trends, the risk metric indicating a risk of accepting the cryptographic endorsement of the cryptoasset transaction from the user device in accordance with a policy retrieved from a vault associated with the cryptoasset transaction; and
    a second server computer in communication with the first server computer and the third server computer, and configured to apply a cryptographic digital signature to the cryptoasset transaction based on the generated risk metric associated with the cryptographic endorsement, using a cryptographic key that is stored only within a secure storage device of the second server computer, the cryptographic key being inaccessible by devices external to the second server computer, the devices external to the second server computer including at least the user device, the first server computer, and the third server computer.

2. The cryptoasset custodial system of claim 1, wherein the second server computer is in communication with the first server computer via a relay server and configured to:
    receive the cryptographic endorsement of the cryptoasset transaction from the first server computer via the relay server, responsive to the risk metric being below a threshold risk metric; and
    generate the cryptographic key associated with the cryptoasset transaction and usable to control access to a blockchain.

3. The cryptoasset custodial system of claim 1, wherein the third server computer is further configured to:
    register the one or more mobile devices on the cryptoasset custodial system prior to receiving the plurality of data points, the registering of the one or more mobile devices performed responsive to receiving, by the first server computer, a registration request from the user device, the registration request associating the user with the one or more mobile devices.

4. The cryptoasset custodial system of claim 3, wherein registering the one or more mobile devices comprises:
    assigning, to each of the one or more mobile devices, a required status or a non-required status, such that a particular data point is collected from each of the one or more mobile devices, wherein at least one of the one or more mobile devices is assigned the required status.

5. The cryptoasset custodial system of claim 1, wherein the third server computer is further configured to:
    generate a graphical visualization comprising the plurality of historic trends; and
    determine expected values of the plurality of data points based on the plurality of historic trends.

6. A method using a cryptoasset custodial system including a first server computer, a second server computer in communication with the first server computer, and a third server computer comprising a risk analysis module, the third server computer in communication with the first server computer and the second server computer, the method comprising:
    transmitting, by the first server computer, to a user device associated with a user, an endorsement request for a cryptoasset transaction to be performed by the first server computer, the endorsement request configured to prompt the user device to sign a cryptographic endorsement of the cryptoasset transaction using a private key associated with the user device;
    receiving, by the first server computer, a plurality of data points collected from one or more mobile devices in communication with the user device, the plurality of data points comprising i) a plurality of biometric data points associated with different biometric categories and ii) an amount of the cryptoasset transaction;
    receiving, by the first server computer, the cryptographic endorsement of the cryptoasset transaction from the user device;
    comparing, by the third server computer, each of the plurality of biometric data points to a corresponding historic trend of a plurality of historic trends generated by the third server computer, wherein the biometric data point and the corresponding historic trend being compared to each other are associated with a same biometric category;
    generating, by the third server computer, a risk metric based at least on the comparison of each of the plurality of data points to the corresponding historic trend of the plurality of historic trends, the risk metric indicating a risk of accepting the cryptographic endorsement from the user device in accordance with a policy retrieved from a vault associated with the cryptoasset transaction; and applying, by the second server computer, a cryptographic digital signature to the cryptoasset transaction based on the generated risk metric associated with the cryptographic endorsement, using a cryptographic key that is stored only within a secure storage device of the second server computer, the cryptographic key being inaccessible by devices external to the second server computer, the devices external to the second server computer including at least the user device, the first server computer, and the third server computer.

7. The method of claim 6, wherein the second server is in communication with the first server computer via a relay server, and wherein the method further comprises:

responsive to the risk metric being below a threshold risk metric, transmitting, from the first server computer, the cryptographic endorsement through a relay server to the second server computer; and generating, by the second server computer, the cryptographic key associated with the cryptoasset transaction and usable to control access to a blockchain.

8. The method of claim 6 further comprising:
registering, by the third server computer, the one or more mobile devices prior to receiving the plurality of data points, the registering of each mobile device of the one or more mobile devices performed responsive to receiving, by the first server computer, a registration request from the user device, the registration request associating the user with the one or more mobile devices.

9. The method of claim 8, wherein registering the one or more mobile devices comprises:

assigning, by the third server computer of the cryptoasset custodial system, a required status or a non-required status to each of the one or more mobile devices, such that a particular data point is collected from each of the one or more mobile devices, wherein at least one of the one or more mobile devices is assigned the required status.

10. The method of claim 6, wherein a mobile device of the one or more mobile devices is a smartwatch or a fitness tracker associated with the user, and wherein the plurality of data points further comprises a geographical location of the smartwatch or the fitness tracker measured by a global positioning system receiver of the smartwatch or the fitness tracker.

11. The method of claim 6, wherein the plurality of data points further comprises at least one of:

an identification number of a mobile device of the one or more mobile devices;

an altitude of the mobile device relative to sea level measured by the mobile device;

a service set identifier of a wireless network that the mobile device is connected to; or a Bluetooth device address of the mobile device.

12. The method of claim 6, further comprising:
detecting, by the third server computer, a mismatch between a first data point of the plurality of data points and a second data point of the plurality of data points, the first data point collected from a first mobile device of the one or more mobile devices and the second data point collected from a second mobile device of the one or more mobile devices; and updating, by the third server computer, the risk metric responsive to detecting the mismatch.

13. The method of claim 6, wherein generating the risk metric further comprises:

extracting, by the third server computer, a feature vector based on the plurality of data points; and generating, by the third server computer, the risk metric based at least on the feature vector, the third server computer trained, using machine learning, to indicate the risk of accepting the cryptographic endorsement based on whether the plurality of data points matches expected values of the plurality of data points.

14. One or more non-transitory computer-readable storage media storing instructions executable by a cryptoasset custodial system including a first server computer, a second server computer, and a third server computer comprising a risk analysis module, the instructions when executed by the cryptoasset custodial system causing the cryptoasset custodial system to:

transmit, by the first server computer, to a user device associated with a user, an endorsement request for a cryptoasset transaction to be performed, the endorsement request configured to prompt the user device to sign a cryptographic endorsement of the cryptoasset transaction using a private key associated with the user device;

receive, by the first server computer, a plurality of data points collected from one or more mobile devices in communication with the user device, the plurality of data points comprising i) a plurality of biometric data points associated with different biometric categories and ii) an amount of the cryptoasset transaction;

receive, by the first server computer, a cryptographic endorsement of the cryptoasset transaction from the user device;

compare, by the third server computer, each of the plurality of biometric data points to a corresponding historic trend of a plurality of historic trends generated by the third server computer, wherein the biometric data point and the corresponding historic trend being compared to each other are associated with a same biometric category;

generate, by the third server computer, a risk metric based at least on the comparison of each of the plurality of data points to the corresponding historic trend of the plurality of historic trends, the risk metric indicating a risk of accepting the cryptographic endorsement from the user device in accordance with a policy retrieved from a vault associated with the cryptoasset transaction; and apply, by the second server computer, a cryptographic digital signature to the cryptoasset transaction based on the generated risk metric associated with the cryptographic endorsement, using a cryptographic key that is stored only within a secure storage device of the second server computer, the cryptographic key being inaccessible by devices external to the second server computer, the devices external to the second server computer including at least the user device, the first server computer, and the third server computer.

15. The one or more non-transitory computer-readable storage media of claim 14, wherein the instructions further cause the second server computer to:

responsive to the risk metric being below a threshold risk metric, generate the cryptographic key associated with the cryptoasset transaction using a key derivation function.

16. The one or more non-transitory computer-readable storage media of claim 14, wherein the instructions further cause the third server computer to:
register the one or more mobile devices prior to receiving the plurality of data points, the registering of the one or more mobile devices performed responsive to receiving a registration request from the user device, the registration request associating the user with the one or more mobile devices.

17. The one or more non-transitory computer-readable storage media of claim 16, wherein registering the one or more mobile devices comprises:
assigning, by the third server computer of the cryptoasset custodial system, to each of the one or more mobile devices, a required status or a non-required status, such that a particular data point is collected from each of the one or more mobile devices, wherein at least one of the one or more mobile devices is assigned the required status.

18. The one or more non-transitory computer-readable storage media of claim 14, wherein a mobile device of the one or more mobile devices is a smartwatch or a fitness tracker associated with the user, and wherein the plurality of data points further comprises a geographical location of the smartwatch or the fitness tracker measured by a global positioning system receiver of the smartwatch or the fitness tracker.

19. The one or more non-transitory computer-readable storage media of claim 14, wherein the plurality of data points further comprises at least one of:
an identification number of a mobile device of the one or more mobile devices;
an altitude of the mobile device relative to sea level measured by the mobile device;
a service set identifier of a wireless network that the mobile device is connected to; or
a Bluetooth device address of the mobile device.

20. The one or more non-transitory computer-readable storage media of claim 14, wherein the instructions further cause the third server computer to:
detect a mismatch between a first data point of the plurality of data points and a second data point of the plurality of data points, the first data point collected from a first mobile device of the one or more mobile devices and the second data point collected from a second mobile device of the one or more mobile devices; and
update the risk metric responsive to detecting the mismatch.

* * * * *